(12) United States Patent
Sabu et al.

(10) Patent No.: US 10,421,424 B2
(45) Date of Patent: Sep. 24, 2019

(54) VEHICLE FRONT STRUCTURE

(71) Applicant: TOYOTA JIDOSHA KABUSHIKI KAISHA, Toyota-shi (JP)

(72) Inventors: Akira Sabu, Toyota (JP); Haruhiko Yamamoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/967,749

(22) Filed: May 1, 2018

(65) Prior Publication Data
US 2018/0334121 A1  Nov. 22, 2018

(30) Foreign Application Priority Data
May 16, 2017 (JP) ................... 2017-097243

(51) Int. Cl.
*B62D 21/15* (2006.01)
*B60R 19/34* (2006.01)
*B62D 21/02* (2006.01)

(52) U.S. Cl.
CPC .............. *B60R 19/34* (2013.01); *B62D 21/02* (2013.01); *B62D 21/152* (2013.01)

(58) Field of Classification Search
CPC ........ B60R 19/34; B62D 21/02; B62D 21/152
USPC ........................................ 293/133
See application file for complete search history.

(56) References Cited

U.S. PATENT DOCUMENTS

| | | | |
|---|---|---|---|
| 9,004,576 B2* | 4/2015 | Sakakibara | B62D 25/085 293/133 |
| 9,539,968 B2* | 1/2017 | Nishida | B62D 21/152 |
| 9,598,033 B1* | 3/2017 | Berger | B60R 19/03 |
| 9,610,980 B2* | 4/2017 | Nakauchi | B60R 19/24 |
| 9,663,050 B2* | 5/2017 | Nishida | B62D 21/152 |
| 9,676,353 B2* | 6/2017 | Sotoyama | B62D 21/152 |
| 2010/0148526 A1 | 6/2010 | Karlander | |
| 2011/0062750 A1* | 3/2011 | Nakaura | B60K 11/08 296/187.09 |
| 2011/0148151 A1* | 6/2011 | Abe | B60R 19/34 296/203.02 |

(Continued)

FOREIGN PATENT DOCUMENTS

| | | |
|---|---|---|
| JP | 2004-338683 | 12/2004 |
| JP | 5087000 | 11/2012 |

(Continued)

*Primary Examiner* — Pinel E Romain
(74) *Attorney, Agent, or Firm* — Oblon, McClelland, Maier & Neustadt, L.L.P.

(57) ABSTRACT

A vehicle front structure includes a crash box having a shape of a rectangular tube extending in the vehicle front-rear direction. The crash box extends farther outward in the vehicle width direction than a front side member, and is provided between the front side member and a bumper reinforcement. The crash box has an upper plate and a lower plate. Each of the upper plate and the lower plate has bead rows disposed in the vehicle width direction. Each of the bead rows is formed by beads extending in the vehicle width direction and arranged at predetermined intervals in the vehicle front-rear direction. The bead rows include a first bead row composed of first beads, and a second bead row composed of second beads longer than the first beads and disposed inward of the first bead row in the vehicle width direction.

9 Claims, 17 Drawing Sheets

(56) References Cited

U.S. PATENT DOCUMENTS

| | | | |
|---|---|---|---|
| 2013/0249245 A1* | 9/2013 | Sekiguchi | B62D 25/082 296/187.09 |
| 2015/0151792 A1* | 6/2015 | Mori | B62D 21/152 296/187.09 |
| 2017/0021868 A1 | 1/2017 | Watanabe et al. | |

FOREIGN PATENT DOCUMENTS

| | | |
|---|---|---|
| JP | 2015-145240 | 8/2015 |
| JP | 2016-117361 | 6/2016 |
| JP | 2017-024552 | 2/2017 |

\* cited by examiner

VEHICLE FRONT STRUCTURE

INCORPORATION BY REFERENCE

The disclosure of Japanese Patent Application No. 2017-097243 filed on May 16, 2017 including the specification, drawings and abstract is incorporated herein by reference in its entirety.

BACKGROUND

1. Technical Field

The present disclosure relates to a vehicle front structure. More particularly, the disclosure relates to a configuration of a crash box that is provided between a front side member and a bumper reinforcement and that undergoes compressive plastic deformation in the vehicle front-rear direction in a frontal collision.

2. Description of Related Art

A crash box that is provided between a front side member and a bumper reinforcement and that absorbs collision energy by undergoing compressive plastic deformation in the vehicle front-rear direction in the event of a frontal collision of the vehicle with a barrier is widely used. Since a front surface of an end of the bumper reinforcement on the outer side in the vehicle width direction is formed by a gently inclined surface, when a frontal collision occurs in which the collision load is input into a part of the vehicle farther on the outer side in the vehicle width direction than the front side member (hereinafter referred to as a small-overlap frontal collision), the collision load acting obliquely inward toward the rear side of the vehicle is input into an outer end of the bumper reinforcement. As a result, the crash box connected to the bumper reinforcement may tilt inward in the vehicle width direction and allow the barrier to pass by the front side member. Thus, in a small-overlap frontal collision, the crash box may fail to effectively absorb the collision energy.

In view of this situation, a structure has been proposed in which an end of a bumper reinforcement on the outer side in the vehicle width direction has a flat part that is parallel to the vehicle width direction (e.g., see Japanese Patent Application Publication No. 2017-24552 (JP 2017-24552 A)).

SUMMARY

When a small-overlap frontal collision occurs, the structure described in JP 2017-24552 A receives the collision load so as to be input into the end of the bumper reinforcement on the outer side in the vehicle width direction, toward the rear side of the vehicle. In the case of a small-overlap frontal collision, however, a larger collision load is input into a part of the crash box on the outer side in the vehicle width direction than a part thereof on the inner side in the vehicle width direction, so that the amount of compressive deformation of the outer-side part of the crash box becomes large earlier than the amount of compressive deformation of the inner-side part thereof. For this reason, the bumper reinforcement is likely to incline during a collision so as to reduce the angle relative to the vehicle front-rear direction, which causes an increase in the collision load input into the bumper reinforcement and acting inward in the vehicle width direction. As a result, the crash box connected to the bumper reinforcement is likely to tilt inward in the vehicle width direction and allow the barrier to pass by the front side member. Then, the crash box can no longer effectively absorb the collision energy. In this respect, there is room for improvement in the configuration described in JP 2017-24552 A.

Therefore, the present disclosure provides a vehicle front structure that allows a crash box to effectively absorb collision energy in the event of a small-overlap frontal collision in which the collision load is input into a part of the vehicle farther on the outer side in the vehicle width direction than the front side member.

An aspect of the disclosure provides a vehicle front structure, including: a front side member disposed outward of a center of a vehicle in a vehicle width direction and extending in a vehicle front-rear direction; a bumper reinforcement disposed at a front end of the vehicle and extending in the vehicle width direction; and a crash box having a shape of a rectangular tube extending in the vehicle front-rear direction, the crash box extending farther outward in the vehicle width direction than the front side member, being provided between an end of the front side member on a front side in the vehicle front-rear direction and the bumper reinforcement and being configured to undergo compressive plastic deformation in the vehicle front-rear direction in a frontal collision of the vehicle, the crash box having an upper plate and a lower plate, the upper plate being arranged upper side of the lower plate in a vehicle height direction, each of the upper plate and the lower plate having bead rows disposed in the vehicle width direction, each of the bead rows being formed by beads extending in the vehicle width direction and arranged at predetermined intervals in the vehicle front-rear direction, the bead rows including a first bead row composed of first beads, and a second bead row composed of second beads longer than the first beads and disposed inward of the first bead row in the vehicle width direction.

In the above aspect, the first bead row and the second bead row may be disposed such that the first beads and the second beads are staggered in the vehicle front-rear direction.

When the first and second beads are disposed as in this aspect, a part of the crash box on the inner side in the vehicle width direction undergoes compressive plastic deformation in the vehicle front-rear direction more easily than a part thereof on the outer side in the vehicle width direction. Thus, even in the case of a small-overlap frontal collision in which the collision load is input into a part of the vehicle farther on the outer side in the vehicle width direction than the front side member, the outer-side part and the inner-side part of the crash box move backward substantially equally during the collision, which makes the bumper reinforcement less likely to incline so as to reduce the angle relative to the vehicle front-rear direction, so that an increase in the collision load input into the bumper reinforcement and acting inward in the vehicle width direction is avoided. It is therefore possible to reduce the likelihood that the crash box tilts inward in the vehicle width direction and allows the barrier to pass by the front side member, and thereby to absorb the collision energy by the entire crash box. Thus, according to this aspect, the crash box can effectively absorb collision energy in the event of a small-overlap frontal collision in which the collision load is input into a part of the vehicle farther on the outer side in the vehicle width direction than the front side member.

In the above aspect, the second beads composing the second bead row may be equal in number to the first beads composing the first bead row, or larger in number than the first beads composing the first bead row.

When the first and second beads are disposed as in this configuration, the inner-side part of the crash box undergoes compressive plastic deformation in the vehicle front-rear direction more easily than the outer-side part thereof. Moreover, load can be smoothly transmitted, so that the crash box undergoes compressive plastic deformation more stably. Thus, the crash box can effectively absorb collision energy in the event of a small-overlap frontal collision.

In the above aspect, the first bead row may be disposed outward of the front side member in the vehicle width direction.

When the first bead row that constitutes a starting point of compressive plastic deformation is disposed as in this configuration near a point at which a collision load is input in a small-overlap frontal collision, a region where the first bead row is disposed is allowed to stably undergo compressive plastic deformation during a collision.

In the above aspect, the second bead row may be disposed such that a position of the second bead row in the vehicle width direction overlaps a position of the front side member in the vehicle width direction in a front view of the vehicle.

This configuration allows a region where the second bead row is disposed to undergo compressive plastic deformation during a small-overlap frontal collision earlier than a region where the first bead row is disposed.

In the above aspect, the bead rows may include a third bead row composed of third beads longer than the first beads, disposed farther on an inner side in the vehicle width direction than the second bead row, and disposed in a region where a position of the third bead row in the vehicle width direction overlaps a position of the front side member in the vehicle width direction in a front view of the vehicle; and the third beads may be disposed such that the second beads and the third beads are staggered.

When the third bead row is disposed as in this configuration, the crash box can effectively absorb collision energy also in the event of a head-on collision, since the third bead row constitutes a starting point of compressive plastic deformation of the crash box in the event of a head-on collision.

In the above aspect, the crash box may have an inner plate and an outer plate, the inner plate being inward of the outer plate in the vehicle width direction, the inner plate may have a vertical bead row formed by vertical beads of a predetermined length extending in the vehicle height direction, the vertical beads being arranged at predetermined intervals in the vehicle front-rear direction, and the outer plate may have no beads.

This configuration allows the inner-side part of the crash box to undergo compressive plastic deformation in the vehicle front-rear direction more easily than the outer-side part thereof. Thus, it is possible to further reduce the likelihood that the crash box tilts inward in the vehicle width direction and allows the barrier to pass by the front side member, and thereby to more effectively absorb the collision energy by the entire crash box.

In the above aspect, the vehicle front structure may further include: a gusset projecting outward in the vehicle width direction from a side surface of a front end portion of the front side member on an outer side of the front end portion of the front side member in the vehicle width direction; and a clearance filling member mounted on a portion of the crash box, the portion projecting farther outward in the vehicle width direction than the front side member, such that a leading end of the clearance filling member faces a front surface of the gusset across a clearance. The clearance filling member is configured to transmit a collision load from the crash box to the gusset when the clearance is lost during the frontal collision.

This configuration allows the portion of the crash box projecting farther outward in the vehicle width direction than the front side member to undergo compressive plastic deformation in the vehicle front-rear direction after the inner-side part of the crash box undergoes compressive plastic deformation. Thus, the outer-side part and the inner-side part of the crash box move backward substantially equally during a collision, which makes the bumper reinforcement less likely to incline so as to reduce the angle relative to the vehicle front-rear direction. Moreover, the portion of the crash box projecting farther outward in the vehicle width direction than the front side member can be crushed flat, and thereby the collision energy can be absorbed more effectively.

In the above aspect, the vehicle front structure may further include: a lower bumper reinforcement disposed below the bumper reinforcement in the vehicle height direction and extending in the vehicle width direction; a first member held and fixed at a fixed portion between a front end of the front side member and a rear end of the crash box and extending downward from the fixed portion; a second member disposed below the front side member in the vehicle height direction, the second member being connected at a front end of the second member to the first member, and extending from the first member toward a rear side of the vehicle; and a lower crash box disposed between the second member and the lower bumper reinforcement, the lower crash box being assembled to the second member via the first member, being connected to the first member, and being configured to undergo compressive plastic deformation in the vehicle front-rear direction in the frontal collision.

With this configuration in which the upper crash box and the lower crash box are connected to each other through the first member, the lower bumper reinforcement moves backward along with the bumper reinforcement, substantially parallel to the vehicle front-rear direction, in the event of a small-overlap frontal collision. Thus, the lower crash box as well as the upper crash box does not tilt inward in the vehicle width direction, and the lower crash box can also effectively absorb the collision energy. It is therefore possible to effectively absorb collision energy by the entire vehicle front structure in the event of a small-overlap frontal collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Structure of Body of Vehicle 100

Figure 1:
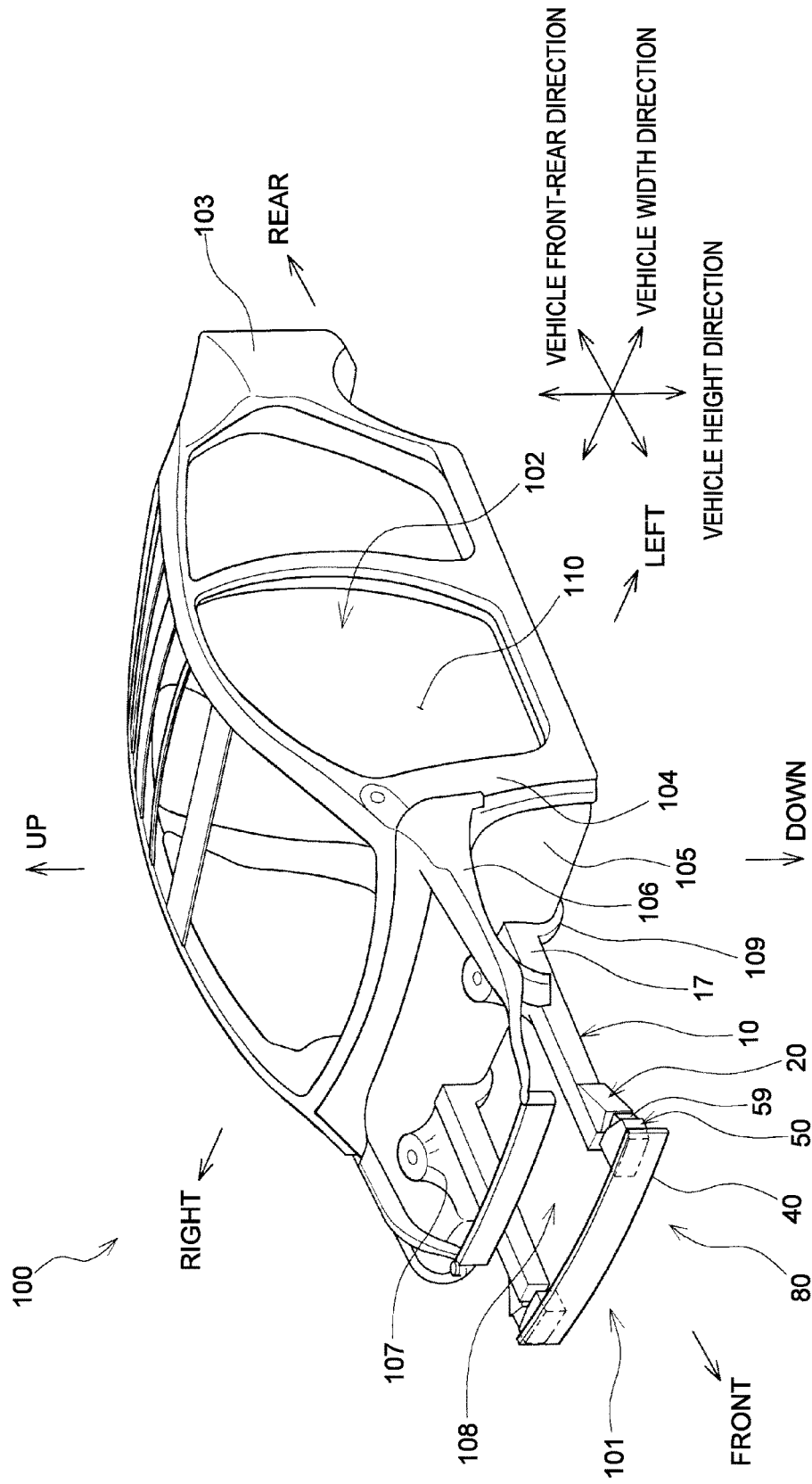
FIG. 1 is a perspective view showing the framework structure of a body of a vehicle in which a vehicle front structure of an embodiment is incorporated.

A vehicle front structure 80 of an embodiment will be described below with reference to the drawings. First, the structure of a body of a vehicle 100 in which the vehicle front structure 80 of the embodiment is incorporated will be described with reference to FIG. 1. As shown in FIG. 1, the vehicle 100 includes a framework structure made of metal, such as aluminum. The vehicle 100 includes a front frame 101 located on a front side of front pillars 104, a rear frame 103, and a cabin frame 102 forming a cabin 110 between the front pillars 104 and the rear frame 103. The front frame 101 includes front side members 10, a bumper reinforcement 40, crash boxes 50, a dashboard panel 105 dividing between the cabin frame 102 and an engine room 108, the front pillars 104, and upper members 106 respectively connected to the front pillars 104 and extending toward a front side of the vehicle. An engine, a driving motor, etc. are installed on the front side members 10. Between the front side members 10 and the upper members 106, suspension towers 107 housing a suspension device of front wheels are provided. A rear end portion 17 of each front side member 10 extends downward along a surface of the dashboard panel 105, and is connected to an under reinforcement 109 disposed on a lower surface of the cabin frame 102.

Configuration of Vehicle Front Structure 80

Figure 2:
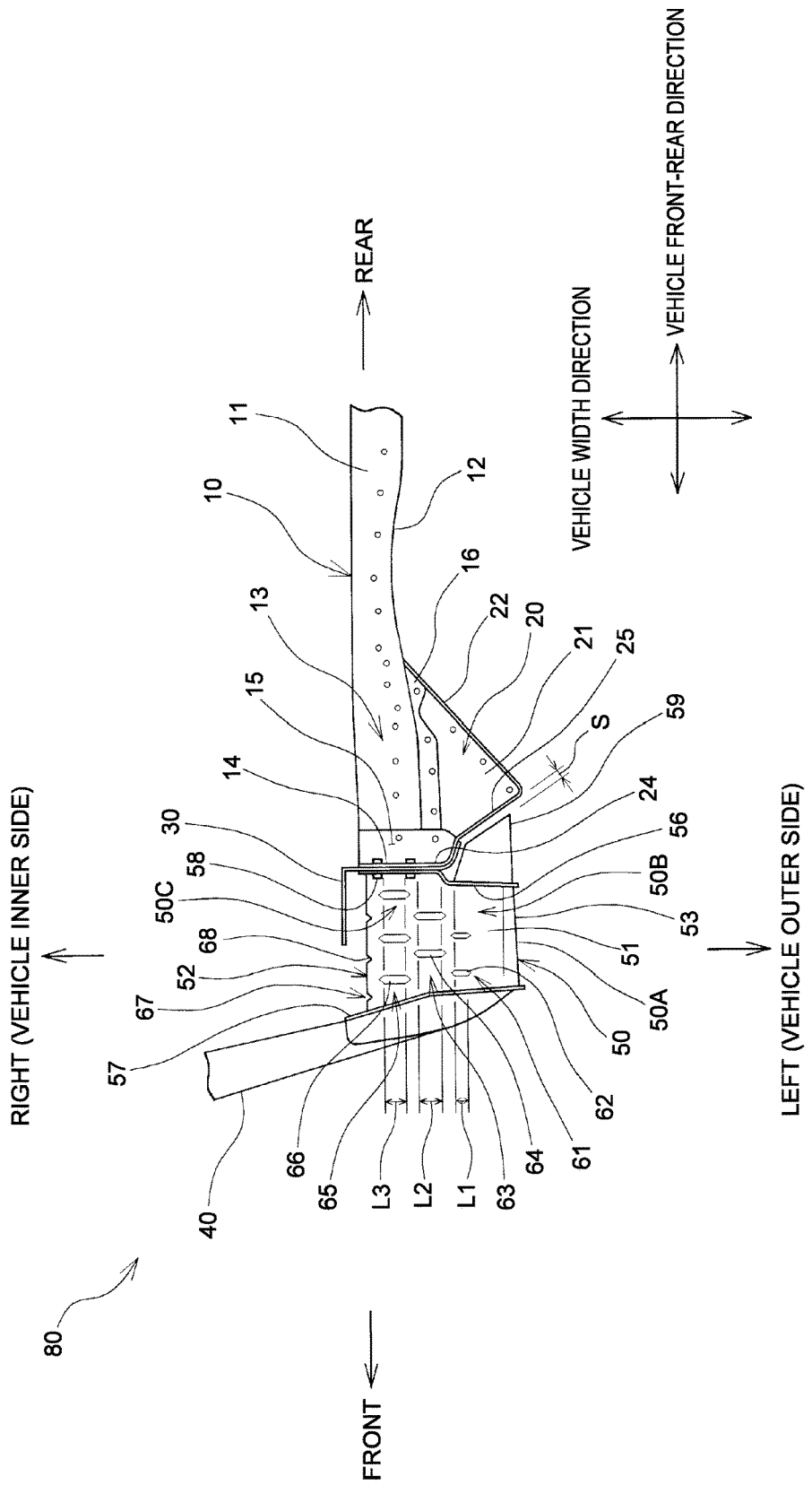
FIG. 2 is a plan view showing main parts of the vehicle front structure of the embodiment.
Figure 3:
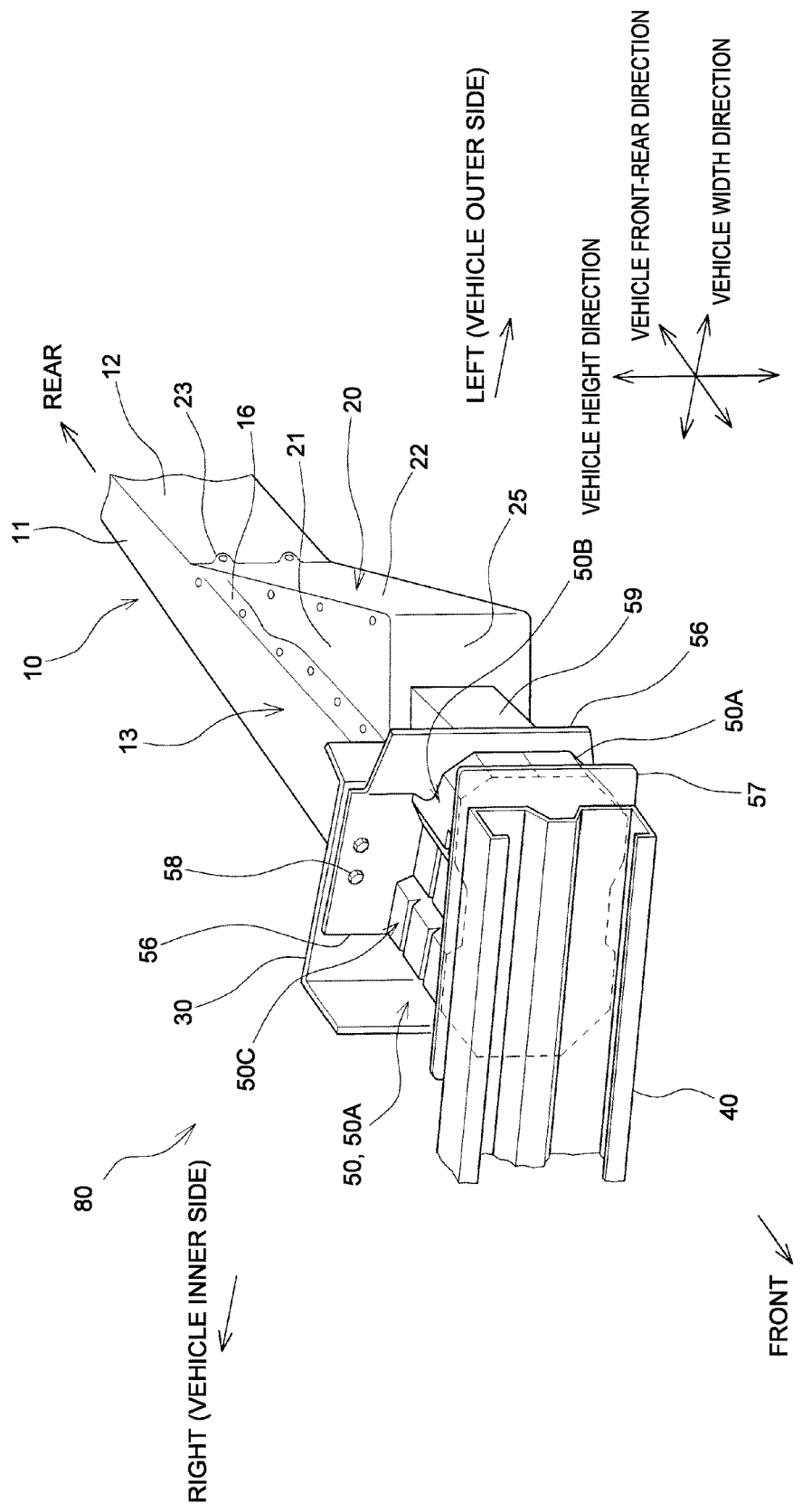
FIG. 3 is a perspective view of the main parts of the vehicle front structure shown in FIG. 2.

FIG. 2 is a plan view showing a part of a left-side part of the vehicle front structure 80 shown in FIG. 1, and FIG. 3 is a perspective view of the same part. The vehicle front structure 80 of this embodiment is a combination of the structure shown in FIG. 2 and FIG. 3 and the same but symmetrical structure provided respectively on left and right sides. As shown in FIG. 2 and FIG. 3, the vehicle front structure 80 of this embodiment includes the front side member 10, the bumper reinforcement 40, and the crash box 50. The vehicle front structure 80 of this embodiment further includes a gusset 20 and a clearance filling member 59.

Front Side Member 10

As shown in FIG. 2 and FIG. 3, the front side member 10 is a rigid member that is disposed on an outer side in the vehicle width direction and extends in a vehicle front-rear direction. The front side member 10 is a hollow rectangular structure with a closed cross-section formed by a front side member inner 11 that has a substantially U-shaped cross-section when cut along a plane orthogonal to a longitudinal direction thereof, and a front side member outer 12 that has a substantially flat-plate shape and closes an open side of the front side member inner 11. An L-shaped flange 15 is spot-welded to a front end 14 of the front side member 10.

Gusset 20

As shown in FIG. 2 and FIG. 3, the gusset 20 projecting outward in the vehicle width direction is mounted on a side surface of a front end portion 13 of the front side member 10 on the outer side in the vehicle width direction. The gusset 20 is a hollow triangular columnar member having a substantially triangular shape in a plan view, and is formed by a ceiling part 21 having a triangular shape in a plan view, a bottom part (not shown), and a side part 22 connecting, in a vehicle height direction, ends of the ceiling part 21 and the bottom part on the outer side in the vehicle width direction. The ceiling part 21 is spot-welded to an upper flange 16 of the front side member inner 11. The bottom part (not shown) is spot-welded to the front side member inner 11. The side part 22 has mount portions 23 that are bent so as to extend along a surface of the front side member outer 12 and spot-welded to the front side member outer 12. The gusset 20 is mounted on the side surface of the front side member 10 such that the vertex of the side part 22 projects outward in the vehicle width direction, and a front end surface 25 of the gusset 20 that is a front-side inclined surface faces a rear end of the clearance filling member 59 to be described later. A part of the flange 15 mounted on the front end 14 of the front side member 10 is placed over and spot-welded to a front corner 24 of the gusset 20.

Crash Box 50

Figure 4:
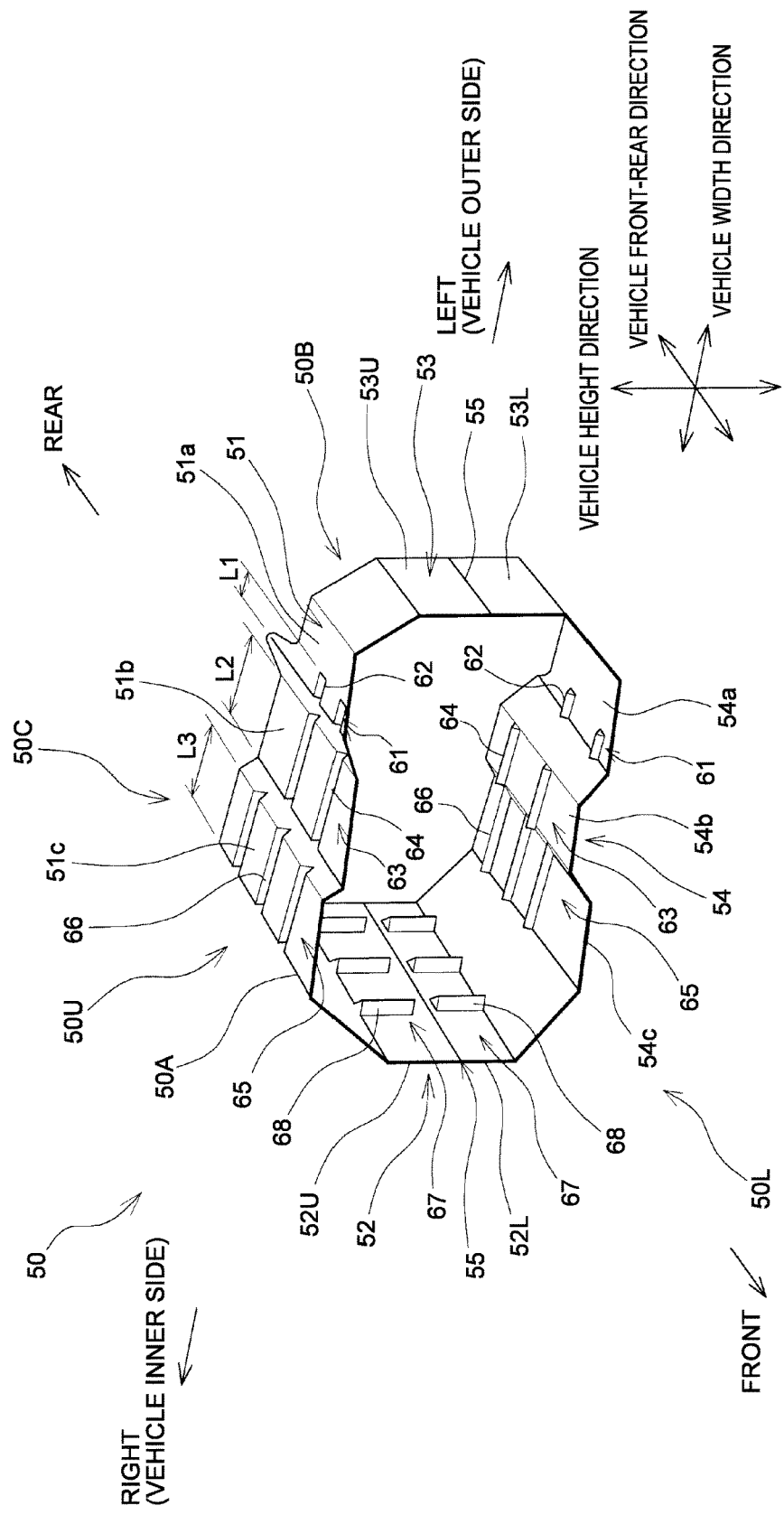
FIG. 4 is an enlarged perspective view of a crash box of the vehicle front structure shown in FIG. 2.

As shown in FIG. 2 and FIG. 3, the crash box 50 is fixed with bolts 58 to the flange 15 on the front side of the front end 14 of the front side member 10. The crash box 50 absorbs collision energy by undergoing compressive plastic deformation in the vehicle front-rear direction in a frontal collision. As shown in FIG. 2 and FIG. 3, the crash box 50 is formed by a main body 50A that is a cornered cocoon-shaped rectangular tubular member extending in the vehicle front-rear direction, a rear end plate 56 covering a rear end of the main body 50A, and a front end plate 57 covering a front end of the main body 50A. As shown in FIG. 4, beads 62, 64, 66 that are recesses are provided in an upper plate 51 and a lower plate 54 of the main body 50A. Moreover, vertical beads 68 that are recesses are provided in a vehicle inner-side plate 52 that is a plate of the main body 50A on the inner side in the vehicle width direction. No beads are provided in a vehicle outer-side plate 53 that is a plate of the main body 50A on the outer side in the vehicle width direction. The arrangement of the beads 62, 64, 66 and the vertical beads 68 and details of the main body 50A will be described later.

As shown in FIG. 2, the main body 50A is formed by a vehicle inner-side part 50C that is located at a position overlapping the flange 15 of the front side member 10 in a front view of the vehicle and can transmit load to the flange 15, and a vehicle outer-side part 50B that projects farther outward in the vehicle width direction than the flange 15. The vehicle inner-side part 50C includes a second upper plate 51b, a second lower plate 54b, a third upper plate 51c, and a third lower plate 54c shown in FIG. 4, and the vehicle outer-side part 50B includes a first upper plate 51a and a first lower plate 54a shown in FIG. 4. As shown in FIG. 2, the length of the main body 50A in the vehicle width direction is larger than the length of the front side member 10 in the vehicle width direction, and the vehicle outer-side part 50B projects farther outward in the vehicle width direction than the front side member 10. The length of the main body 50A in the vehicle height direction is smaller than the length of the front side member 10 in the vehicle height direction, and thus the main body 50A does not project from the front side member 10 in the height direction.

A radiator support 30 that is formed by bending a flat plate into a crank shape is held between a part of the rear end plate 56 that is located on the inner side of the vehicle and covers a rear end of the vehicle inner-side part 50C of the main body 50A, and the flange 15 mounted on the front end 14 of the front side member 10. The rear end plate 56 and the radiator support 30 are fastened together with the bolts 58 to the flange 15.

The clearance filling member 59 is mounted on a rear end-side surface of a part of the rear end plate 56 that is located on the outer side of the vehicle and covers the rear end of the vehicle outer-side part 50B of the main body 50A. The clearance filling member 59 is a member that is fixed to the rear end plate 56 and defines a clearance S between the front end surface 25 of the gusset 20 and the clearance filling member 59.

Bumper Reinforcement 40

As shown in FIG. 1 to FIG. 3, the bumper reinforcement 40 is mounted on a front-side surface of the front end plate 57 of the crash box 50. The bumper reinforcement 40 is a rigid member that is disposed at the front end of the vehicle and extends in the vehicle width direction, and that is suspended across front ends of the crash boxes 50 that are disposed respectively on both sides of the vehicle as shown in FIG. 1.

Detailed Structure of Crash Box 50

As shown in FIG. 4, the main body 50A of the crash box 50 is a cornered cocoon-shaped rectangular tubular member that extends in the vehicle front-rear direction and is formed by welding, along joint lines 55, an inversed U-shaped upper half 50U with a center portion recessed inward and a U-shaped lower half 5OL with a center portion recessed inward.

The main body 50A includes the upper plate 51, the lower plate 54, the vehicle inner-side plate 52, and the vehicle outer-side plate 53. The upper plate 51 includes the first upper plate 51a located on the outer side in the vehicle width direction, the third upper plate 51c located at the same level as the first upper plate 51a and on the inner side in the vehicle width direction, and the second upper plate 51b located between the first upper plate 51a and the third upper plate 51c and at a lower level than the first upper plate 51a and the third upper plate 51c. The second upper plate 51b is connected to each of the first upper plate 51a and the third upper plate 51c by an inclined plate. Thus, the upper plate 51 has a bent plate structure, with the first upper plate 51a and the third upper plate 51c forming ridges and the second upper plate 51b forming a valley. Similarly to the upper plate 51, the lower plate 54 includes the first lower plate 54a located on the outer side in the vehicle width direction, the third lower plate 54c located at the same level as the first lower plate 54a and on the inner side in the vehicle width direction, and the second lower plate 54b located between the first lower plate 54a and the third lower plate 54c and at a higher level than the first lower plate 54a and the third lower plate 54c. The second lower plate 54b is connected to each of the first lower plate 54a and the third lower plate 54c by an inclined plate. Similarly to the upper plate 51, the lower plate 54 has a bent plate structure, with the first lower plate 54a and the third lower plate 54c forming ridges and the second lower plate 54b forming a valley.

The vehicle inner-side plate 52 is connected to each of the third upper plate 51c and the third lower plate 54c by an inclined plate. Similarly, the vehicle outer-side plate 53 is connected to each of the first upper plate 51a and the first lower plate 54a by an inclined plate.

As shown in FIG. 2, the second upper plate 51b, the second lower plate 54b, the third upper plate 51c, and the third lower plate 54c are located at positions overlapping the flange 15 of the front side member 10 in a front view of the vehicle, and the vehicle inner-side plate 52 is located at a position overlapping the front side member 10 in a front view of the vehicle. Thus, the second upper plate 51b, the second lower plate 54b, the third upper plate 51c, the third lower plate 54c, and the vehicle inner-side plate 52 are included in the vehicle inner-side part 50C that is a part that transmits a load acting in the vehicle front-rear direction directly to the front side member 10. On the other hand, the first upper plate 51a, the first lower plate 54a, and the vehicle outer-side plate 53 are located farther on the outer side in the vehicle width direction than the front side member 10, and are included in the vehicle outer-side part 50B that is a part that transmits a load acting in the vehicle front-rear direction to the front side member 10 through the gusset 20.

As shown in FIG. 2 and FIG. 4, the first beads 62 of a length L1 extending in the vehicle width direction are disposed in a region of each of the first upper plate 51a and the first lower plate 54a on the inner side of the vehicle, in two stages at a predetermined interval in the vehicle front-rear direction. The first beads 62 disposed in two stages form one first bead row 61. As described above, the first upper plate 51a and the first lower plate 54a are located farther on the outer side in the vehicle width direction than the front side member 10, and therefore the first bead rows 61 are disposed farther on the outer side in the vehicle width direction than the front side member 10. Thus, the first bead rows 61 are disposed at such positions that the first bead rows 61 transmit a load acting in the vehicle front-rear direction to the front side member 10 through the gusset 20.

The second beads 64 of a length L2 extending in the vehicle width direction are disposed in each of the second upper plate 51b and the second lower plate 54b, in two stages at a predetermined interval in the vehicle front-rear direction. The second beads 64 disposed in two stages form one second bead row 63. Similarly, the third beads 66 of a length L3 extending in the vehicle width direction are disposed in each of the third upper plate 51c and the third lower plate 54c, in three stages at predetermined intervals in the vehicle front-rear direction. The third beads 66 disposed in three stages form one third bead row 65. As described above, the second upper plate 51b, the second lower plate 54b, the third upper plate 51c, and the third lower plate 54c are located at positions overlapping the flange 15 of the front side member 10 in a front view of the vehicle, and therefore the second bead rows 63 and the third bead rows 65 are disposed at such positions that these bead rows can transmit a load acting in the vehicle front-rear direction directly to the front side member 10 through the flange 15.

The length L2 of the second beads 64 is larger than the length L1 of the first beads 62. In this embodiment, the length L3 of the third beads 66 is substantially equal to the length L2 of the second beads 64. The relation among the lengths L1, L2, L3 is L3≈L2>L1. The first bead row 61 and the second bead row 63 are disposed such that the first beads 62 and the second beads 64 are staggered. As shown in FIG. 2 and FIG. 4, the first beads 62 and the second beads 64 are disposed so as to be separated from each other and alternate with each other in both the vehicle front-rear direction and the vehicle width direction. Similarly, the second bead row 63 and the third bead row 65 are disposed such that the second beads 64 and the third beads 66 are staggered, and such that the second beads 64 and the third beads 66 are separated from each other and alternate with each other in both the vehicle front-rear direction and the vehicle width direction. The first beads 62 and the third beads 66 may be disposed at the same positions in the vehicle front-rear direction, or may be disposed at positions shifted from each other in the vehicle front-rear direction.

As shown in FIG. 4, the beads 62, 64, 66 are recesses extending in the vehicle width direction. Ends of the third bead 66 in the vehicle width direction each form a cutout appearing in the adjacent inclined plate. Both ends of the second bead 64 are recessed from the second upper plate 51b. An end of the first bead 62 on the inner side in the vehicle width direction forms a cutout appearing in the adjacent inclined plate as with the third bead 66, while an end of the first bead 62 on the outer side in the vehicle width direction is recessed from the first upper plate 51a.

As shown in FIG. 4, the vertical beads 68 each extending in the vehicle height direction are disposed in three stages at predetermined intervals, in each of a vehicle inner-side plate 52U of the upper half 50U and a vehicle inner-side plate 52L of the lower half 5OL forming the vehicle inner-side plate 52 of the main body 50A. The vertical beads 68 disposed in three stages form one vertical bead row 67. Thus, one vertical bead row 67 is disposed in each of the vehicle inner-side plate 52U and the vehicle inner-side plate 52L, and therefore the vertical bead rows 67 are disposed in two stages in the height direction in the vehicle inner-side plate 52 of the main body 50A. As with the first bead 62, an end of the vertical bead 68 on the side of the joint line 55 is recessed from the vehicle inner-side plate 52U or 52L, while an end thereof on the other side forms a cutout appearing in the adjacent inclined plate.

As described above, the vehicle inner-side plate 52 is located at a position overlapping the flange 15 of the front side member 10 in a front view of the vehicle, and therefore the vertical bead rows 67 are disposed at such positions that the vertical bead rows 67 can transmit a load acting in the vehicle front-rear direction directly to the front side member 10.

When a compressive force is applied to the beads 62, 64, 66, 68 in a direction orthogonal to the direction in which the groove having a cross-section extends, the stress concentrates at a bottom portion of the groove, causing these beads to deform so as to close the opening of the groove. As a result, the surfaces provided with the beads 62, 64, 66, 68 are crushed by undergoing accordion-like compressive plastic deformation. Thus, the beads 62, 64, 66, 68 form starting points of accordion-like compressive plastic deformation of the surfaces provided with the beads 62, 64, 66, 68. Moreover, the beads 62, 64, 66, 68 form low-rigidity portions of the plate members.

As described above, no beads are provided in a vehicle outer-side plate 53U of the upper half 50U and a vehicle outer-side plate 53L of the lower half 5OL forming the vehicle outer-side plate 53 of the main body 50A.

Workings and Effects of Vehicle Front Structure 80 of Embodiment in the Event of Small-Overlap Frontal Collision The workings and effects of the vehicle front structure 80 of this embodiment, configured as has been described above, in the event of a small-overlap frontal collision will be described with reference to FIG. 5 to FIG. 8. A small-overlap frontal collision here refers to a type of frontal collisions of the vehicle 100, in which a part of the vehicle farther on the outer side in the vehicle width direction than the front side member 10 collides with a barrier B.

Figure 5:
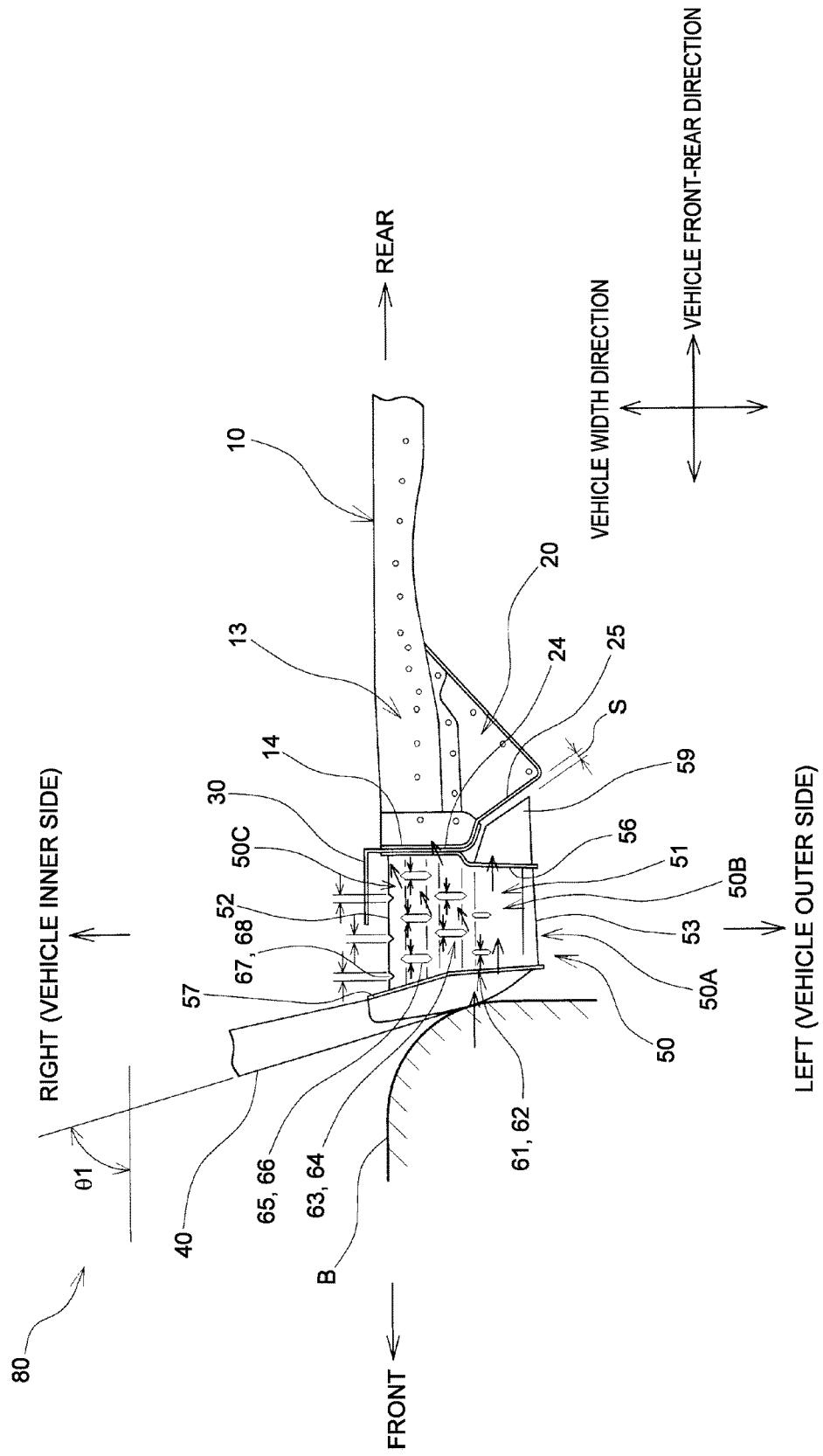
FIG. 5 is a plan view showing a state of a vehicle to which the vehicle front structure shown in FIG. 2 is applied, immediately after a small-overlap frontal collision with a barrier.

As shown in FIG. 5, in the case of a small-overlap frontal collision, a part of the bumper reinforcement 40 farther on the outer side in the vehicle width direction than the front side member 10 collides with the barrier B. Since the clearance S remains between the clearance filling member 59 and the front end surface 25 of the gusset 20 immediately after the collision, the collision load input into the bumper reinforcement 40 is not transmitted to the gusset 20, but propagates in a direction toward an obliquely rear side of the vehicle, from a load input point located farther on the outer side in the vehicle width direction than the front side member 10, through the upper plate 51 and the lower plate 54 of the crash box 50, to the front side member 10. As indicated by the arrows in FIG. 5, the load propagates in the direction toward the obliquely rear side of the vehicle, from the input point through clearances between the staggered beads 62, 64, 66.

Then, the collision load is input from the flange 15 into the front side member 10 as a load acting toward the rear side of the vehicle. This load is received by the front side member 10, and compresses the vehicle inner-side part 50C of the crash box 50 in the vehicle front-rear direction. This compressive force acts on the second beads 64, the third beads 66, and the vertical beads 68 in a direction of closing the V-shaped openings as indicated by the opposite arrows in FIG. 5, and thus the beads 64, 66, 68 undergo compressive deformation so as to close the openings thereof. With these beads serving as starting points, the second upper plate 51b, the third upper plate 51c, the second lower plate 54b, the third lower plate 54c, and the vehicle inner-side plate 52 included in the vehicle inner-side part 50C of the crash box 50 undergo accordion-like compressive deformation.

Meanwhile, the load input into the vehicle outer-side part 50B of the crash box 50 deforms the rear end plate 56 toward the rear side of the vehicle, and causes the vehicle outer-side part 50B to move backward toward the gusset 20. As long as the clearance S remains between the clearance filling member 59 and the front end surface 25 of the gusset 20, the collision load input into the bumper reinforcement 40 is not transmitted to the gusset 20, and therefore the vehicle outer-side part 50B is not subjected to a large compressive force. In addition, no large beads are provided in the vehicle outer-side part 50B. For these reasons, the vehicle outer-side part 50B does not undergo as much compressive deformation as the vehicle inner-side part 50C.

Figure 6:
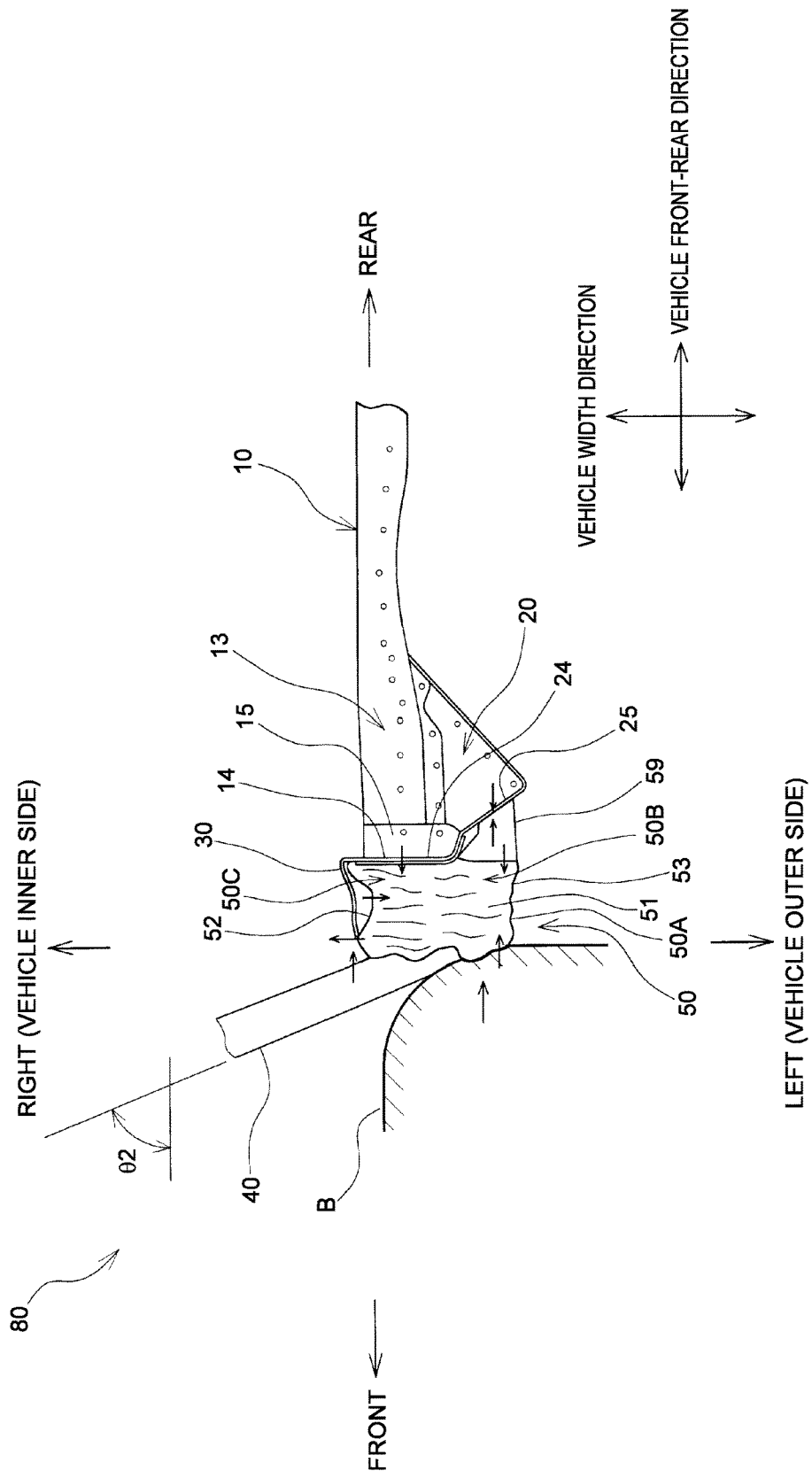
FIG. 6 is a plan view showing a state of the vehicle to which the vehicle front structure shown in FIG. 2 is applied, in an initial stage of the small-overlap frontal collision with the barrier.

As a result, as shown in FIG. 6, at the point in time when the clearance filling member 59 hits the front end surface 25 of the gusset 20, the second upper plate 51b, the third upper plate 51c, the second lower plate 54b, the third lower plate 54c, and the vehicle inner-side plate 52 forming the vehicle inner-side part 50C of the crash box 50 have undergone accordion-like compressive deformation, while the first upper plate 51a, the first lower plate 54a, and the vehicle outer-side plate 53 forming the vehicle outer-side part 50B have merely moved backward toward the rear side of the vehicle and have not undergone significant deformation. Since the amount of backward movement of a part of the bumper reinforcement 40 connected to the vehicle inner-side part 50C due to the compressive deformation of the vehicle inner-side part 50C, and the amount of backward movement of a part of the bumper reinforcement 40 connected to the vehicle outer-side part 50B due to the backward movement of the vehicle outer-side part 50B, are substantially equal to each other, the bumper reinforcement 40 moves backward substantially parallel to the vehicle front-rear direction, without inclining relative to the vehicle front-rear direction. Thus, an inclination angle θ1 of the bumper reinforcement 40 relative to the vehicle front-rear direction shown in FIG. 5 and an inclination angle θ2 of the bumper reinforcement 40 relative to the vehicle front-rear direction shown in FIG. 6 are substantially equal to each other.

Figure 7:
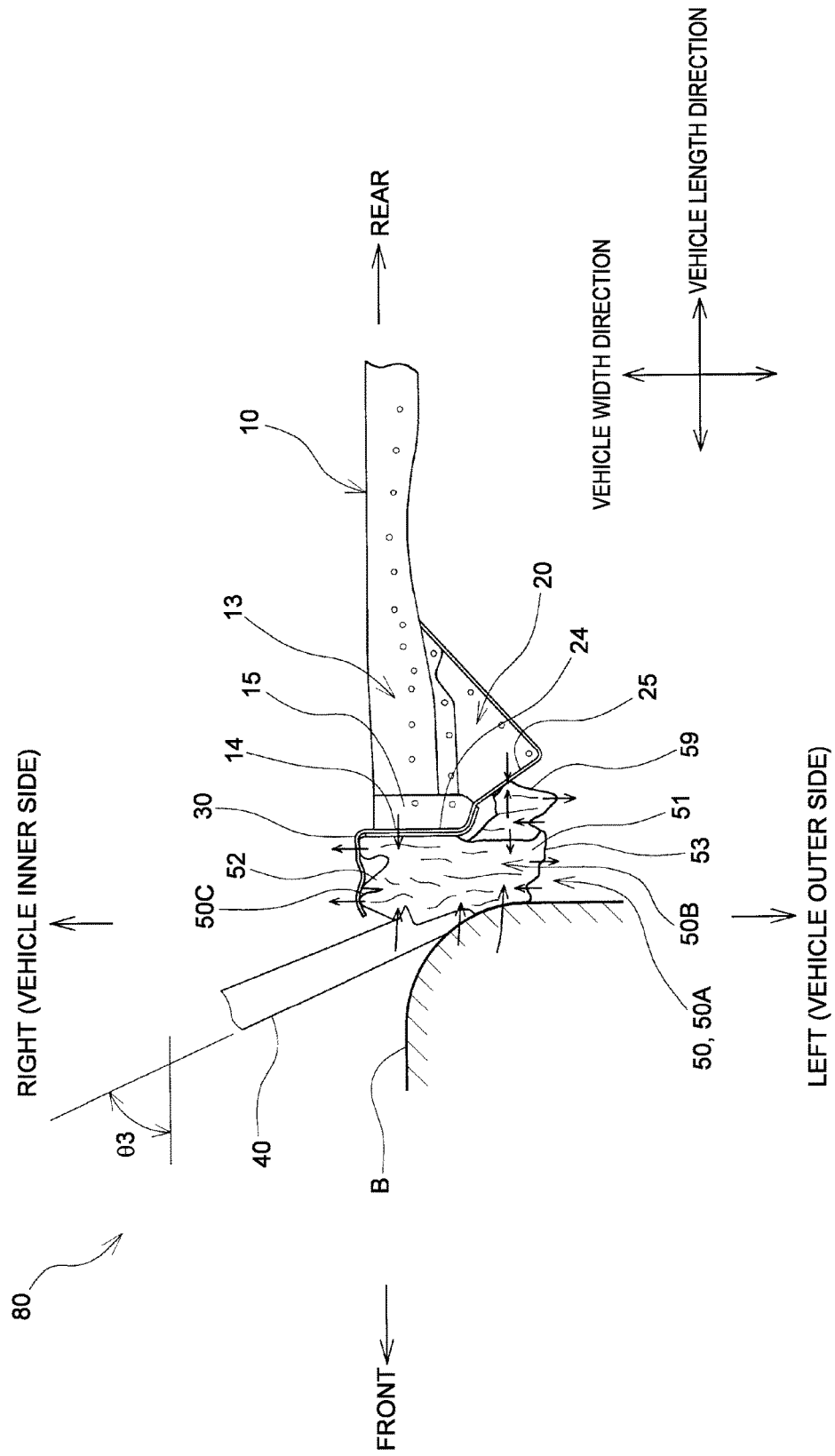
FIG. 7 is a plan view showing a state of the vehicle to which the vehicle front structure shown in FIG. 2 is applied, in an intermediate stage of the small-overlap frontal collision with the barrier.

When time has passed from the state shown in FIG. 6, as shown in FIG. 7, the collision load input into the vehicle outer-side part 50B of the crash box 50 is transmitted to the gusset 20 through the clearance filling member 59. As the load acting in the vehicle front-rear direction that is transmitted to the gusset 20 is received by the front side member 10, this collision load compresses the vehicle outer-side part 50B of the crash box 50 in the vehicle front-rear direction. Under this compressive force, the first beads 62 provided in the first upper plate 51a and the first lower plate 54a undergo compressive deformation so as to close the openings. Starting from this compressive deformation of the first beads 62, the first upper plate 51a, the first lower plate 54a, and the vehicle outer-side plate 53 forming the vehicle outer-side part 50B are crushed like an accordion as shown in FIG. 7. In this process, the collision load is transmitted also to the vehicle inner-side part 50C of the crash box 50, so that the second upper plate 51b, the third upper plate 51c, the second lower plate 54b, the third lower plate 54c, and the vehicle inner-side plate 52 forming the vehicle inner-side part 50C are further crushed from the state shown in FIG. 6. The vehicle inner-side part 50C is unlikely to incline the bumper reinforcement 40 by exerting a reaction force in the vehicle front-rear direction, since the rigidity of the vehicle inner-side part 50C in the vehicle front-rear direction has become extremely low as a result of the compressive plastic deformation during the period from the state shown in FIG. 5 to the state shown in FIG. 6. Accordingly, the bumper reinforcement 40 moves backward substantially parallel to the vehicle front-rear direction, without inclining relative to the vehicle front-rear direction. Thus, an inclination angle θ3 of the bumper reinforcement 40 relative to the vehicle front-rear direction shown in FIG. 7 is substantially equal to the inclination angles θ1, θ2 of the bumper reinforcement 40 relative to the vehicle front-rear direction shown in FIG. 5 and FIG. 6.

Figure 8:
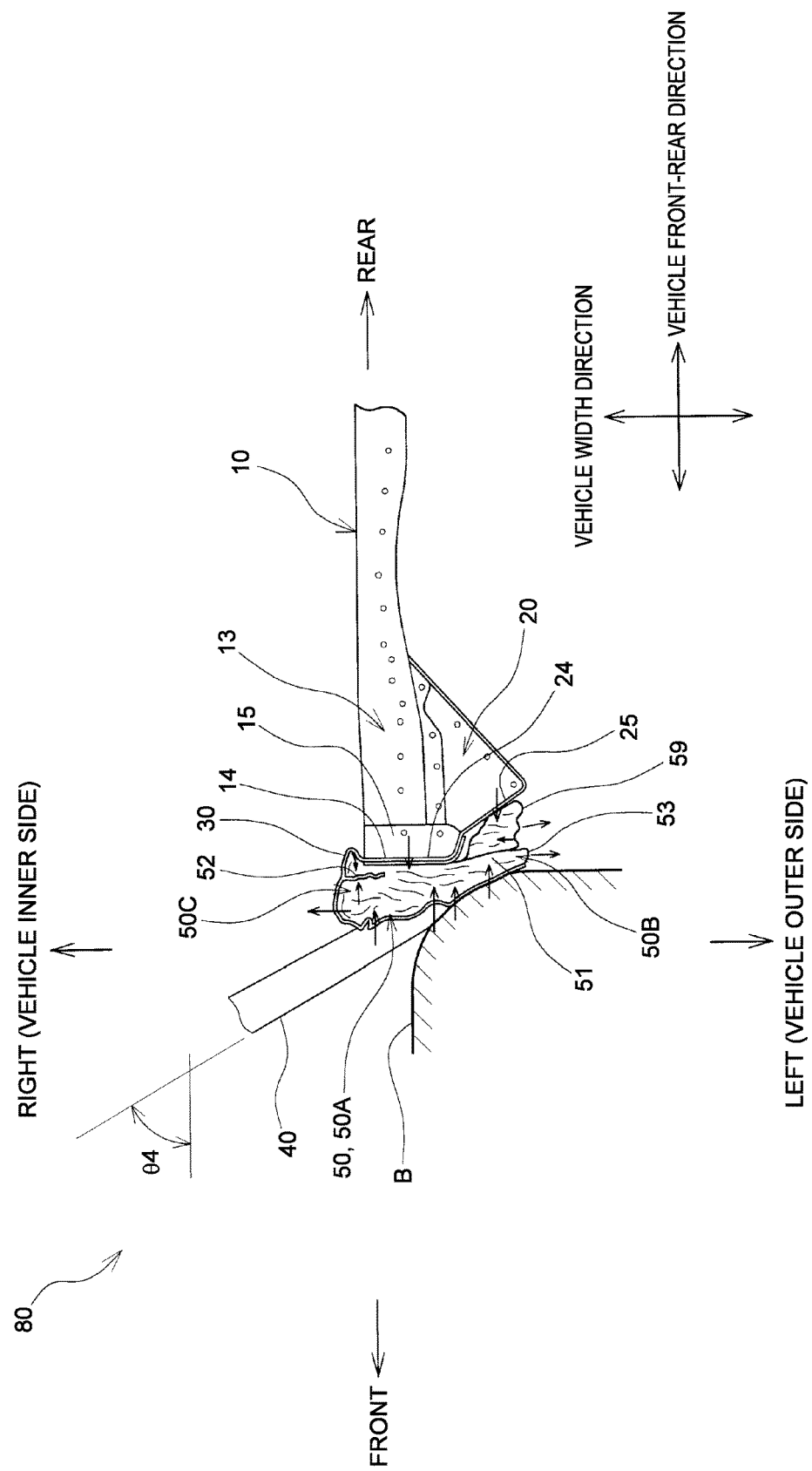
FIG. 8 is a plan view showing a state of the vehicle to which the vehicle front structure shown in FIG. 2 is applied, in which the crash box is substantially crushed in the small-overlap frontal collision with the barrier.

When time has further passed from the state shown in FIG. 7, as shown in FIG. 8, the second upper plate 51b, the third upper plate 51c, the second lower plate 54b, the third lower plate 54c, the vehicle inner-side plate 52 forming the vehicle inner-side part 50C, and the first upper plate 51a, the first lower plate 54a, and the vehicle outer-side plate 53 forming the vehicle outer-side part 50B reach a state of being substantially completely crushed flat. When these plates are crushed flat, a reaction force in the vehicle front-rear direction exerted by the vehicle inner-side part 50C and that exerted by the vehicle outer-side part 50B become substantially equal to each other, so that the vehicle outer-side part 50B which is located closer to the input point of the collision load and into which a larger load is input is compressed a little more than the vehicle inner-side part 50C. Accordingly, the bumper reinforcement 40 slightly inclines relative to the vehicle front-rear direction. Thus, an inclination angle θ4 of the bumper reinforcement 40 relative to the vehicle front-rear direction shown in FIG. 8 is slightly smaller than the inclination angles θ1 to θ3 of the bumper reinforcement 40 relative to the vehicle front-rear direction shown in FIG. 5 to FIG. 7.

As has been described above, in the vehicle front structure 80 of this embodiment, the second bead rows 63 and the third bead rows 65 of longer beads are disposed in the second upper plate 51b, the third upper plate 51c, the second lower plate 54b, and the third lower plate 54c forming the vehicle inner-side part 50C of the crash box 50; the vertical bead rows 67 are disposed in the vehicle inner-side plate 52; the first bead rows 61 of shorter beads are disposed in the first upper plate 51a and the first lower plate 54a forming the vehicle outer-side part 50B; and no beads are disposed in the vehicle outer-side plate 53. Thus, the vehicle inner-side part 50C of the crash box 50 undergoes compressive deformation in the vehicle front-rear direction more easily than the vehicle outer-side part 50B. Moreover, the crash box 50 is configured such that the vehicle inner-side part 50C can transmit a load acting in the vehicle front-rear direction directly to the front side member 10 immediately after a collision, while the vehicle outer-side part 50B transmits a load acting in the vehicle front-rear direction to the front side member 10 after the clearance S becomes zero. From immediately after a collision to an initial stage of the collision, this configuration allows the vehicle inner-side part 50C to undergo compressive plastic deformation and the vehicle outer-side part 50B to move backward until the clearance S becomes zero, and after the initial stage of the collision, this configuration allows the vehicle outer-side part 50B and the vehicle inner-side part 50C, of which the rigidity has decreased as a result of the compressive plastic deformation in the initial stage, to undergo compressive plastic deformation together. Thus, the vehicle outer-side part 50B and the vehicle inner-side part 50C of the crash box 50 move backward substantially equally during a collision, which makes the bumper reinforcement 40 less likely to incline so as to reduce the angle relative to the vehicle front-rear direction.

Thus, the vehicle front structure 80 can avoid causing an increase in the collision load input into the bumper reinforcement 40 and acting inward in the vehicle width direction, and can reduce the likelihood that the crash box 50 tilts inward in the vehicle width direction and allows the barrier B to pass by the front side member 10. Moreover, the collision energy can be absorbed by the entire crash box 50, as both the vehicle inner-side part 50C and the vehicle outer-side part 50B of the crash box 50 can be crushed flat. Thus, the present disclosure allows the crash box 50 to more effectively absorb the collision energy in the event of a small-overlap frontal collision in which the collision load is input into a part of the vehicle farther on the outer side in the vehicle width direction than the front side member 10.

Vehicle Front Structure 900 of Comparative Example and Deformation Thereof in the Event of Small-Overlap Frontal Collision Next, deformation of parts of a vehicle including a vehicle front structure 900 of a comparative example in the event of a small-overlap frontal collision will be described with reference to FIG. 9 to FIG. 11.

Figure 9:
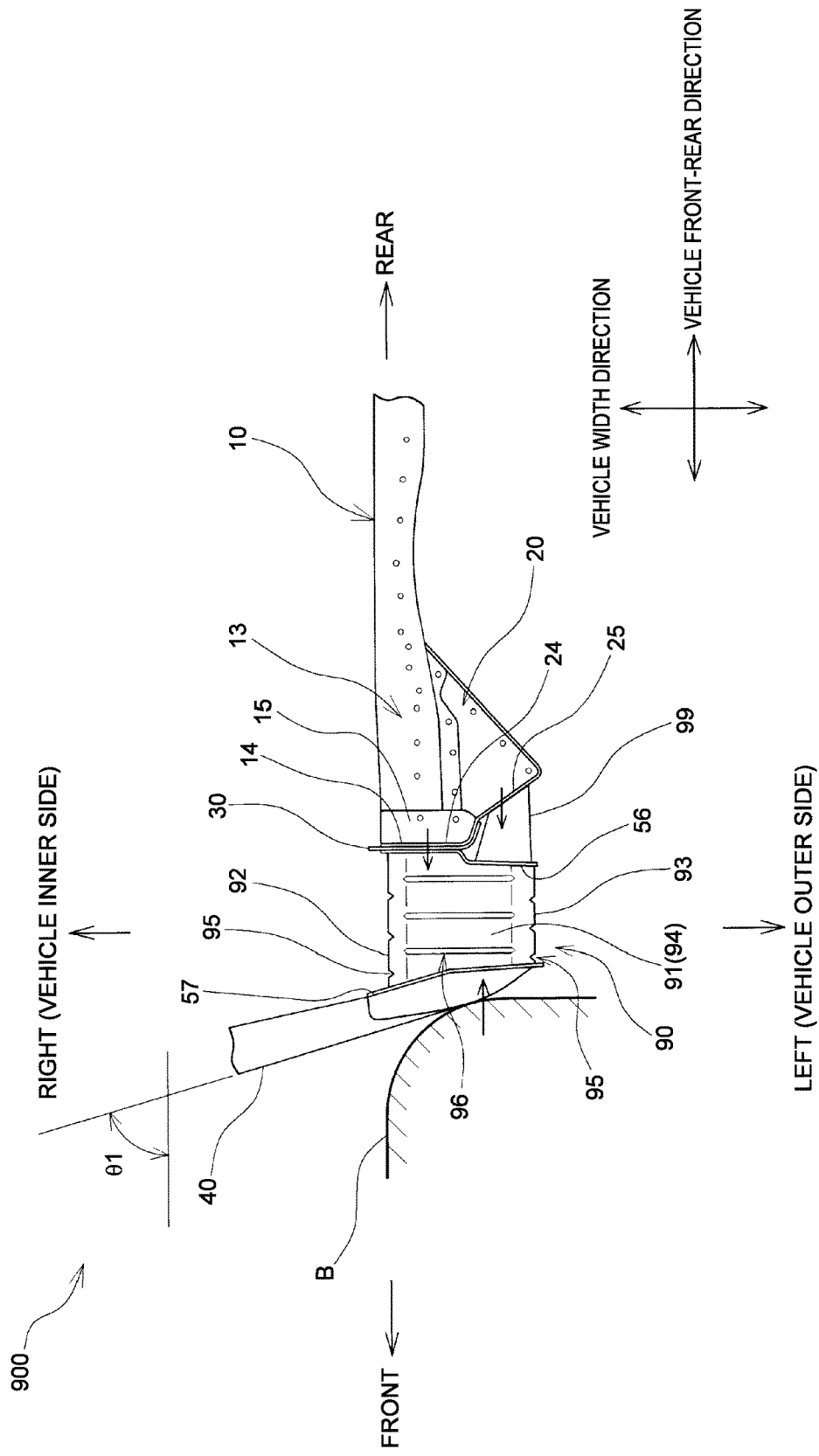
FIG. 9 is a plan view showing a state of a vehicle to which a vehicle front structure according to a comparative example is applied, immediately after a small-overlap frontal collision with a barrier.

As shown in FIG. 9, a crash box 90 of the comparative example has a laterally long, substantially octagonal shape, with beads 96 of a uniform length provided in three stages in each of an upper plate 91 and a lower plate 94, and with similar vertical beads 95 provided in each of a vehicle inner-side plate 92 and a vehicle outer-side plate 93. A clearance filling member 99 at its initial position is in contact with the front end surface 25 of the gusset 20.

As shown in FIG. 9, when a small-overlap frontal collision occurs, a part of the bumper reinforcement 40 farther on the outer side in the vehicle width direction than the front side member 10 collides with the barrier B. Thus, the collision load is input into a part of the vehicle farther on the outer side in the vehicle width direction than the front side member 10. This collision load is received by the front side member 10 and the gusset 20. Under this collision load, the crash box 90 is compressed in the vehicle front-rear direction. Since the input point of the collision load is located closer to the outer side of the crash box 90 in the vehicle front-rear direction, a vehicle outer-side part of the crash box 90 is subjected to a larger load than a vehicle inner-side part thereof. The vertical beads 95 are provided in the vehicle outer-side plate 93 of the crash box 90 as in the vehicle inner-side plate 92. Thus, as shown in FIG. 10, in an initial stage of the collision, the vehicle outer-side plate 93 undergoes significant compressive deformation. As a result, the bumper reinforcement 40 inclines in a direction of reducing the inclination angle θ1 relative to the vehicle front-rear direction shown in FIG. 9, so that the angle relative to the vehicle front-rear direction is reduced to an inclination angle θ5 smaller than the inclination angle θ1.

Then, components of the collision load input from the barrier B into the bumper reinforcement 40 that act toward the inner side of the vehicle increase, causing the bumper reinforcement 40 to move toward the inner side of the vehicle. Meanwhile, the crash box 90 deforms such that the entire crash box 90 tilts toward a right side that is the inner side in the vehicle width direction.

Figure 10:
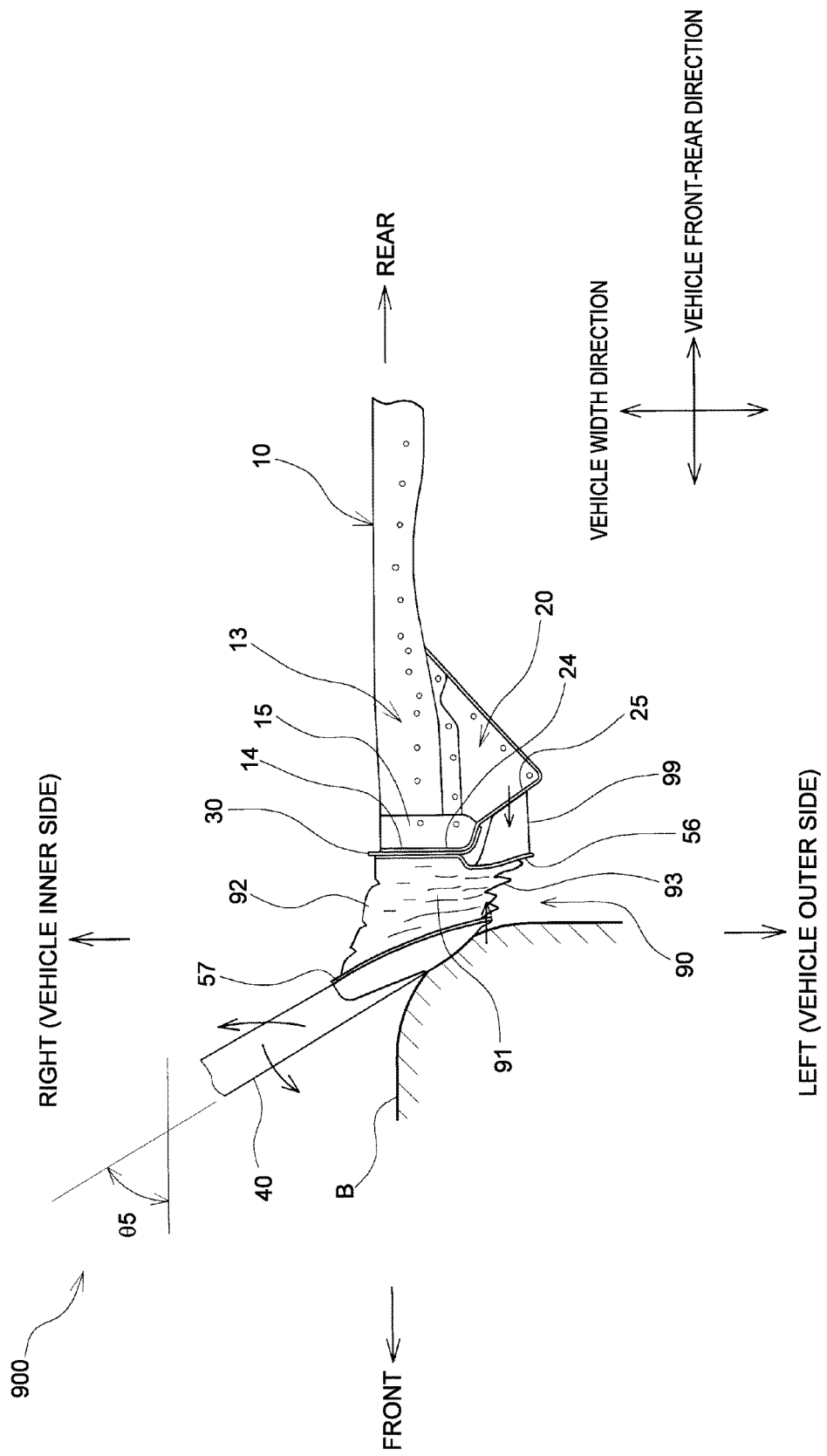
FIG. 10 is a plan view showing a state of the vehicle to which the vehicle front structure according to the comparative example is applied, in an intermediate stage of the small-overlap frontal collision with the barrier.
Figure 11:
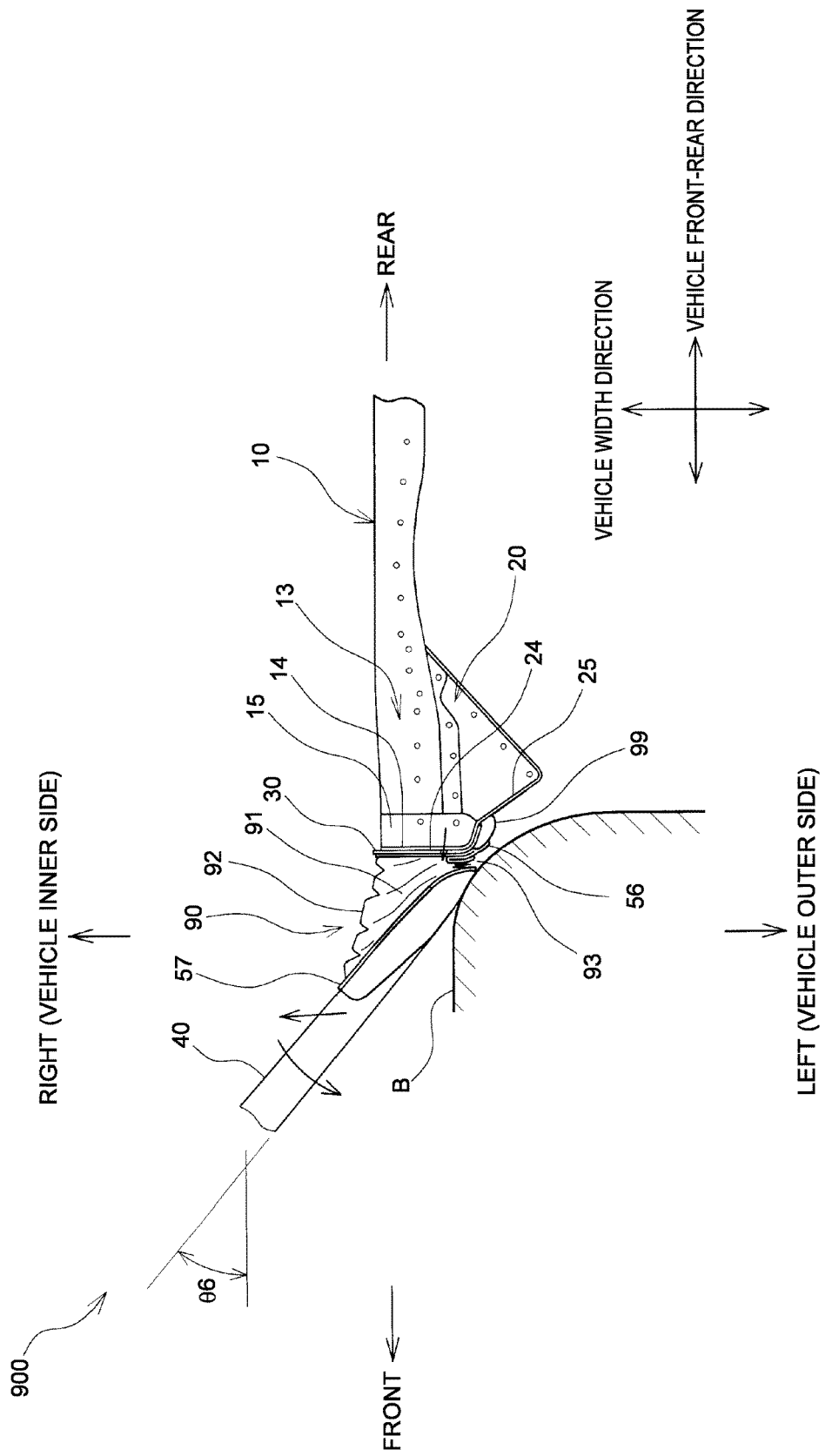
FIG. 11 is a plan view showing a state of the vehicle to which the vehicle front structure according to the comparative example is applied, in which a part of the crash box on an outer side in a vehicle width direction is substantially crushed in the small-overlap frontal collision with the barrier.

When time has passed from the state shown in FIG. 10, components of the collision load input from the barrier B into the bumper reinforcement 40 that act toward the inner side of the vehicle further increase, so that the crash box 90 further tilts toward the right side as shown in FIG. 11. Then, the bumper reinforcement 40 further moves toward the right side as shown in FIG. 11, since the vehicle inner-side plate 92 is not significantly crushed despite the vehicle outer-side plate 93 being substantially completely crushed. After the state shown in FIG. 11 is reached, the barrier B passes by the front side member 10 on the outer side thereof in the vehicle width direction.

Thus, in the vehicle front structure 900 of the comparative example, when a small-overlap frontal collision occurs, the bumper reinforcement 40 inclines so as to reduce the angle relative to the vehicle front-rear direction during the collision, so that the collision load input into the bumper reinforcement 40 and acting inward in the vehicle width direction increases. As a result, the crash box 90 tilts inward in the vehicle width direction and allows the barrier B to pass by the front side member 10. Therefore, the crash box 90 cannot effectively absorb the collision energy.

By contrast, as described above, the vehicle front structure 80 of the embodiment having been described with reference to FIG. 1 to FIG. 8 can avoid causing an increase in the collision load input into the bumper reinforcement 40 and acting inward in the vehicle width direction, and can reduce the likelihood that the crash box 50 tilts inward in the vehicle width direction and allows the barrier B to pass by the front side member 10. Moreover, the collision energy can be absorbed by the entire crash box 50, as both the vehicle inner-side part 50C and the vehicle outer-side part 50B of the crash box 50 can be crushed flat.

Workings and Effects of Vehicle Front Structure 80 of Embodiment in the Event of Head-on Collision Next, the workings and effects of the vehicle front structure 80 of the embodiment in the event of a head-on collision will be briefly described with reference to FIG. 12 to FIG. 15. A head-on collision refers to a type of frontal collision in which the vehicle 100 collides with the barrier B head-on from the front side.

Figure 12:
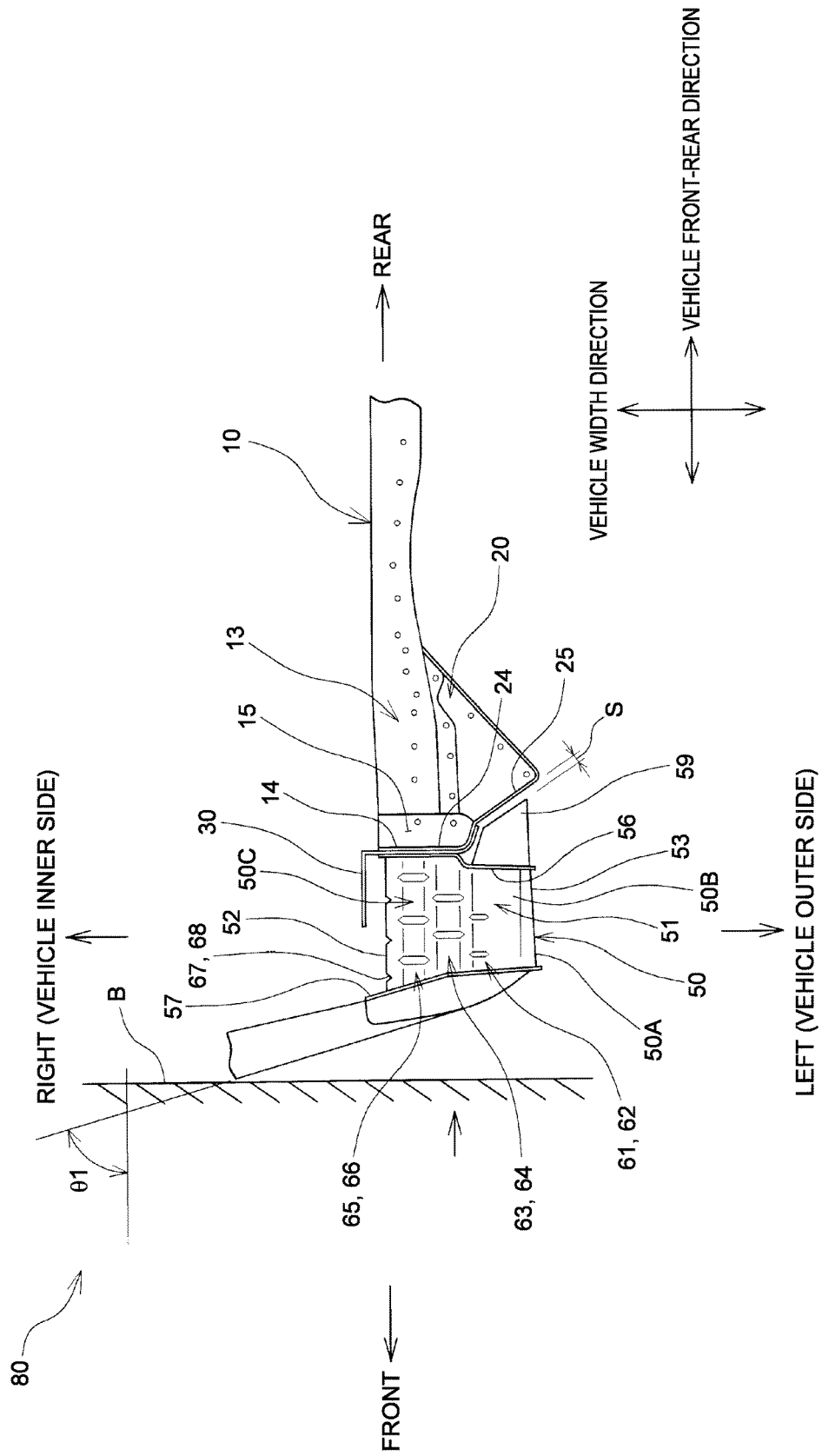
FIG. 12 is a plan view showing a state of a vehicle to which the vehicle front structure shown in FIG. 2 is applied, immediately after a head-on collision with a barrier.

Since the bumper reinforcement 40 is a bow-shaped member that protrudes toward the front side at a center in the vehicle width direction as shown in FIG. 1, when a head-on collision occurs, a part of the bumper reinforcement 40 at the center in the vehicle width direction collides with the barrier B as shown in FIG. 12.

Figure 13:
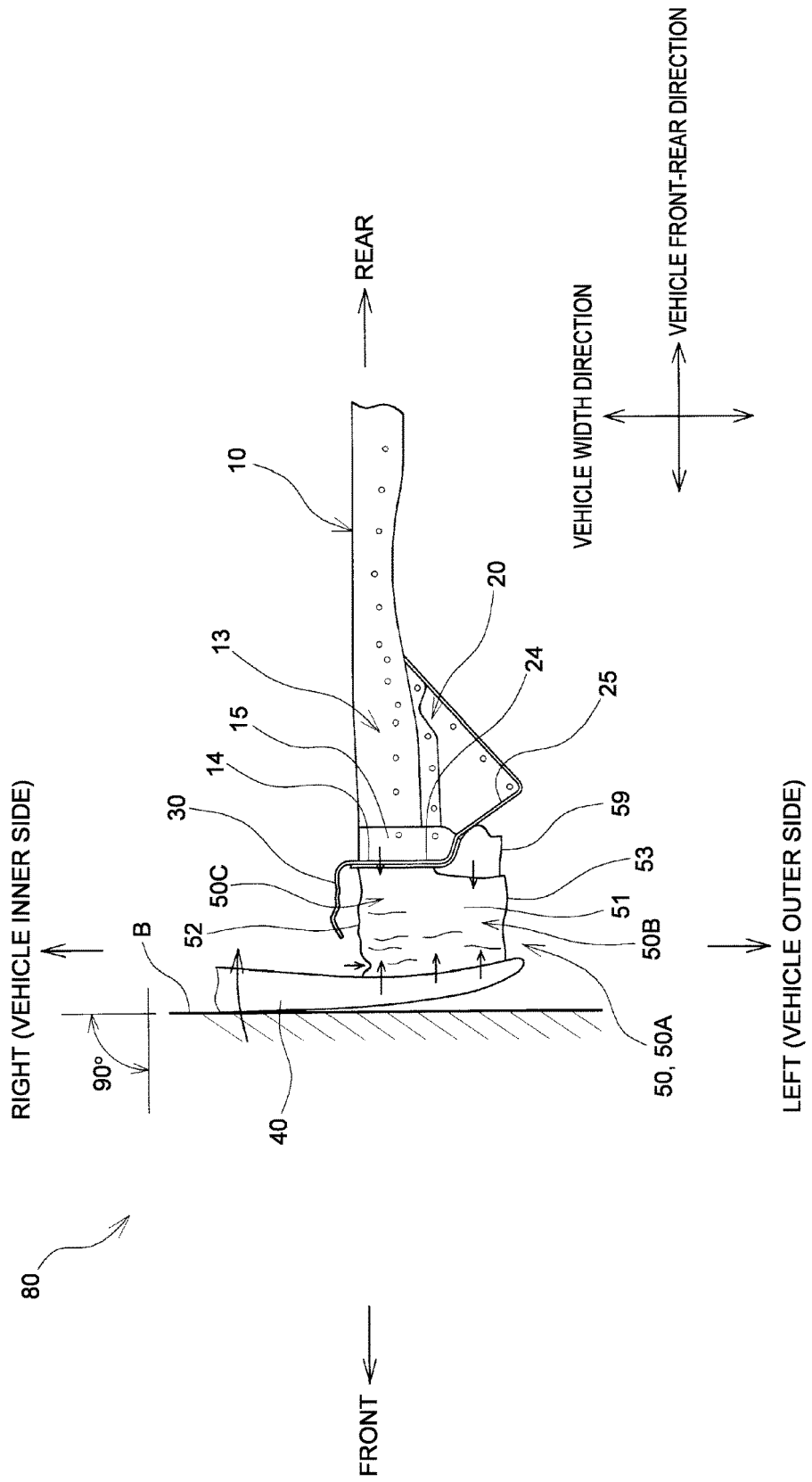
FIG. 13 is a plan view showing a state of the vehicle to which the vehicle front structure shown in FIG. 2 is applied, in an initial stage of the head-on collision with the barrier.

As the collision progresses, the barrier B inclines the bumper reinforcement 40 such that the angle of the bumper reinforcement 40 relative to the vehicle front-rear direction becomes 90° as shown in FIG. 13. Then, the crash box 50 starts to be compressed under the collision load.

Figure 14:
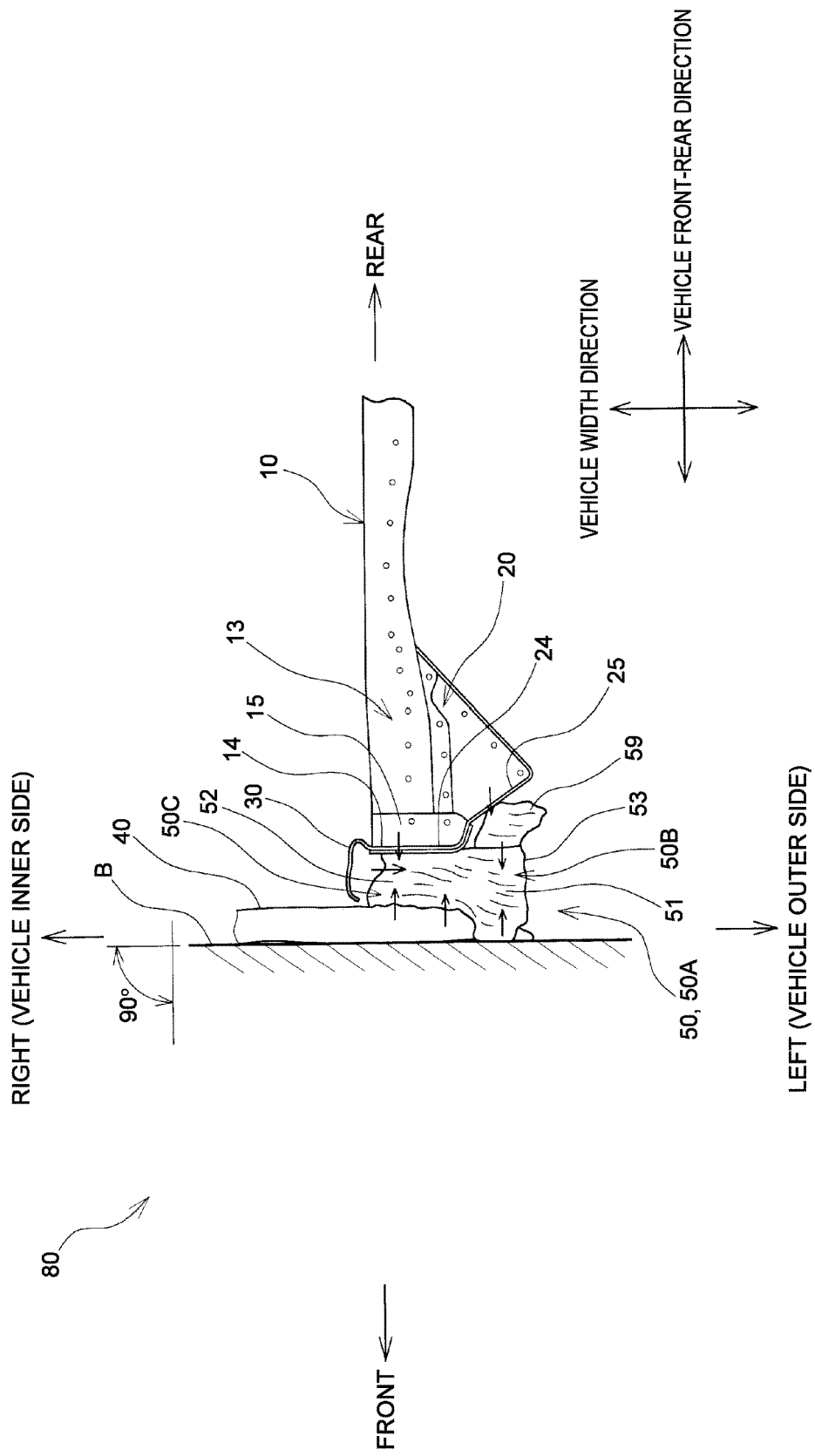
FIG. 14 is a plan view showing a state of the vehicle to which the vehicle front structure shown in FIG. 2 is applied, in an intermediate stage of the head-on collision with the barrier.
Figure 15:
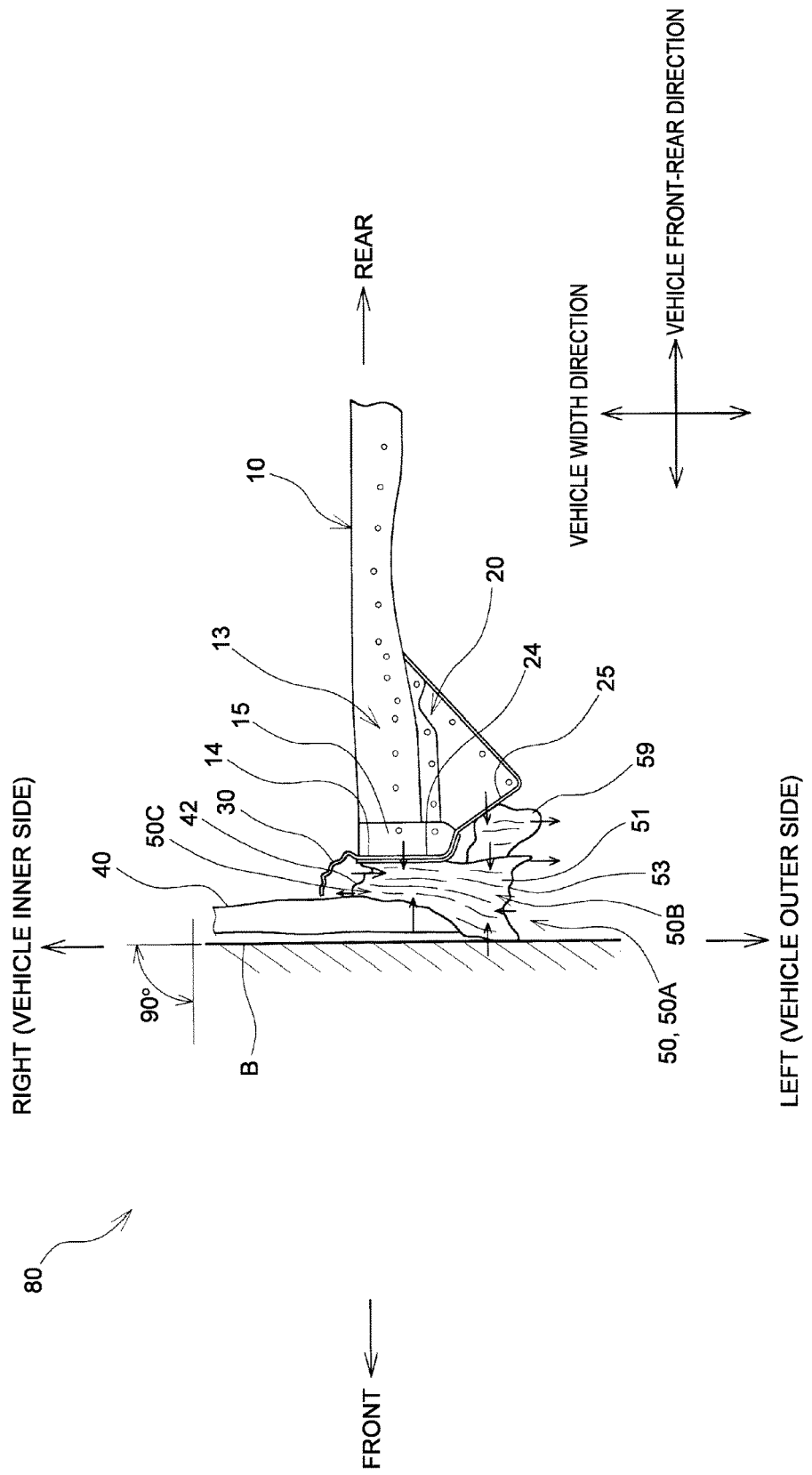
FIG. 15 is a plan view showing a state of the vehicle to which the vehicle front structure shown in FIG. 2 is applied, in which the crash box is substantially crushed in the head-on collision with the barrier.

As shown in FIG. 14, from an initial stage to an intermediate stage of the collision, the vehicle inner-side part 50C of the crash box 50 undergoes compressive deformation, starting from the vertical bead rows 67 and the third bead rows 65. Thereafter, the vehicle outer-side part 50B undergoes compressive plastic deformation as shown in FIG. 15. Then, the vehicle inner-side part 50C and the vehicle outer-side part 50B of the crash box 50 are substantially completely crushed as shown in FIG. 15.

Thus, the vehicle front structure 80 of this embodiment can effectively absorb collision energy in the event of a head-on collision, as the crash box 50 can be entirely crushed by compressive deformation starting from the vertical bead rows 67 and the third bead rows 65.

In the above embodiment, the first bead row 61 and the second bead row 63 have been described as being formed by the beads that are disposed in two stages, and the third bead row 65 has been described as being formed by the beads that are disposed in three stages. However, the arrangement of the bead rows is not limited to this example; alternatively, the first bead row 61 may be composed of two stages of beads, while the second bead row 63 and the third bead row 65 may be composed of three stages of beads. Moreover, instead of dividing the upper plate 51 and the lower plate 54 respectively into three regions of the first upper plate 51a to the third upper plate 51c and three regions of the first lower plate 54a to the third lower plate 54c, these plates may be each divided into two regions on the outer side and the inner side in the vehicle width direction, and the first bead row 61 may be disposed in the vehicle outer-side region and the second bead row 63 may be disposed in the vehicle inner-side region.

Configuration of Vehicle Front Structure 85 of Another Embodiment

Next, a vehicle front structure 85 of another embodiment will be described with reference to FIG. 16 and FIG. 17. Those parts that are the same as in the vehicle front structure 80 of the embodiment described above with reference to FIG. 1 to FIG. 8 will be denoted by the same reference signs and description thereof will be omitted.

Figure 16:
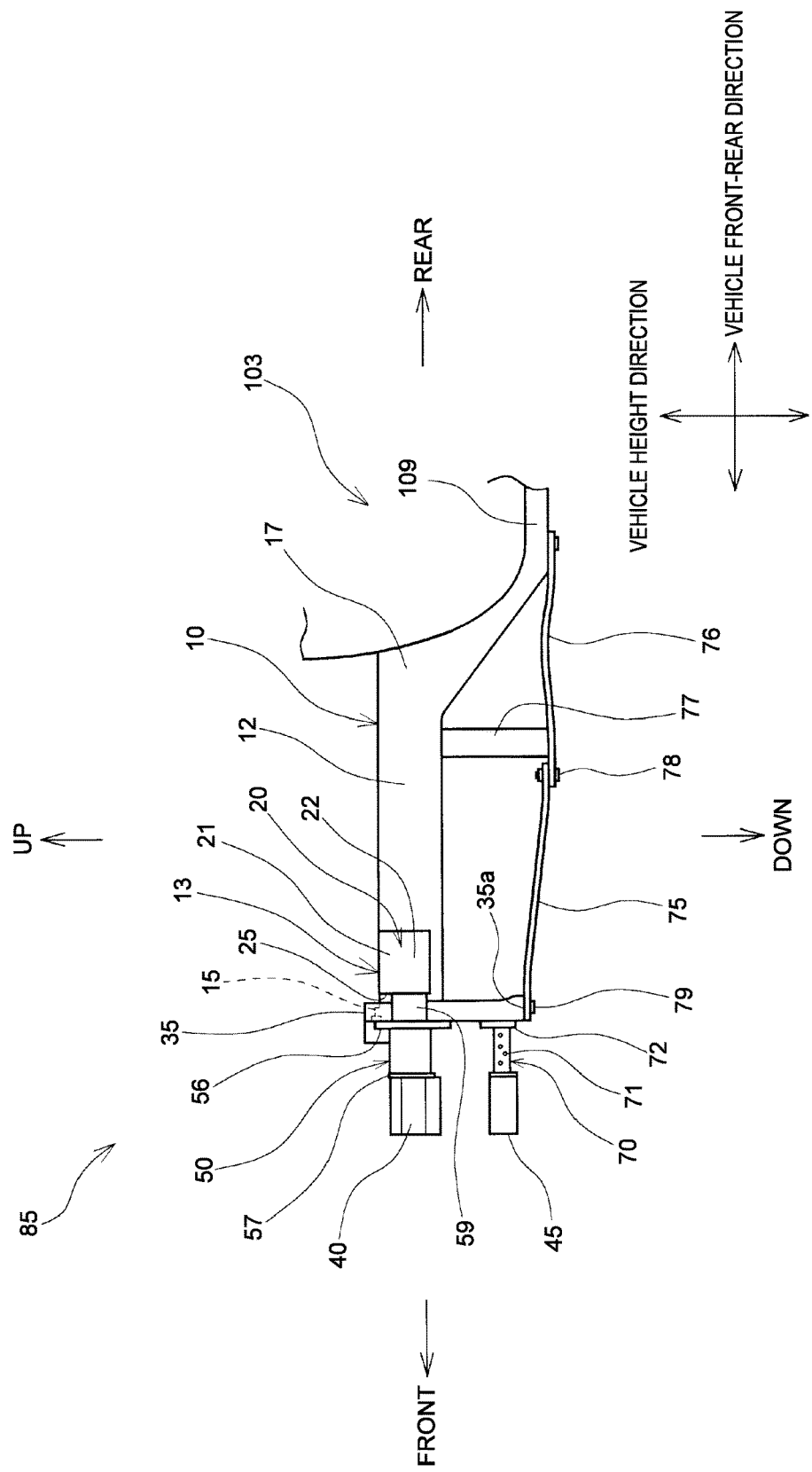
FIG. 16 is an elevation view showing main parts of a vehicle front structure of another embodiment.
Figure 17:
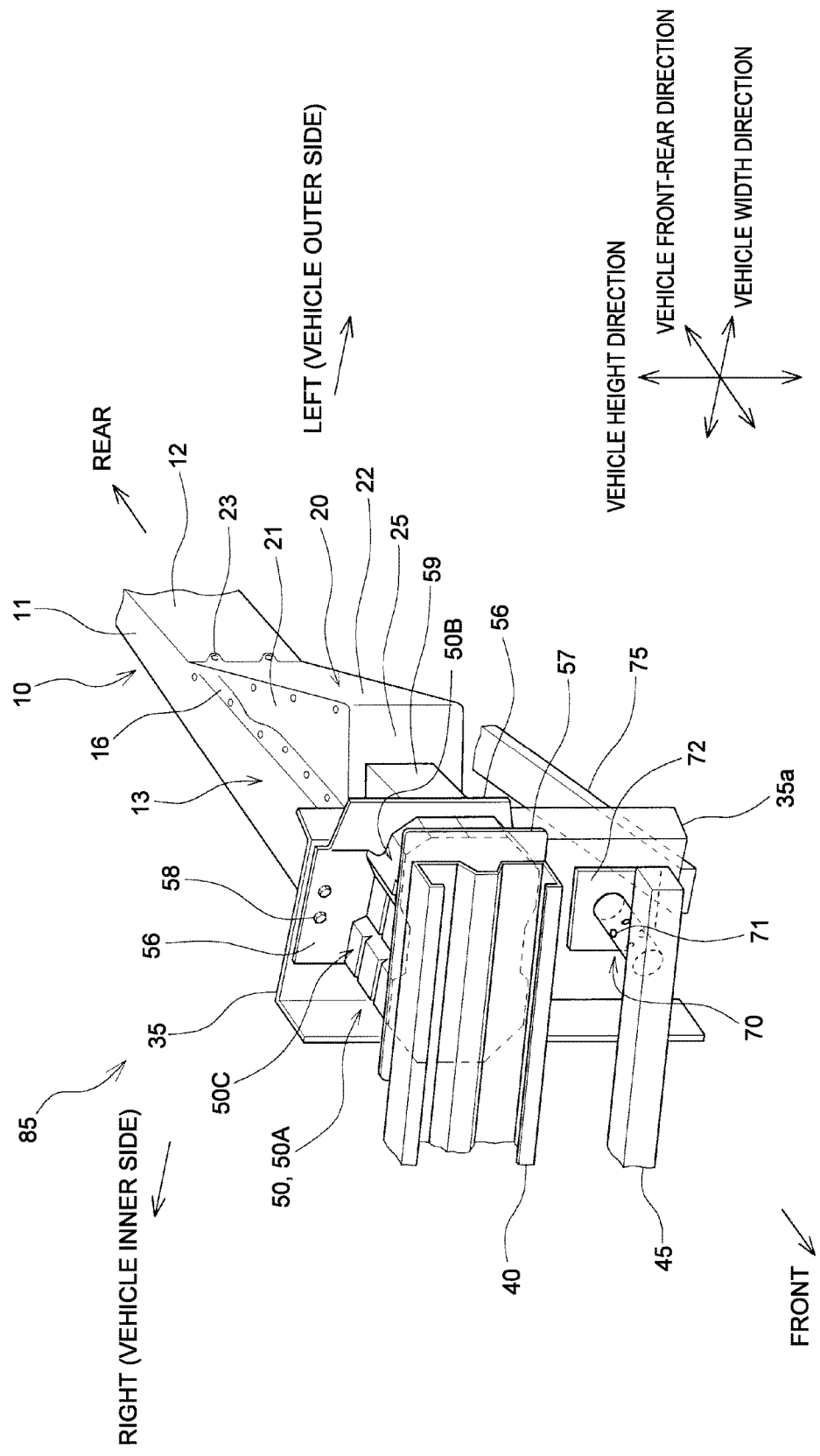
FIG. 17 is a perspective view showing the main parts of the vehicle front structure of the same embodiment.

As shown in FIG. 16 and FIG. 17, the vehicle front structure 85 of this embodiment includes a radiator support 35 that is long in the height direction in place of the radiator support 30 of the vehicle front structure 80 of the embodiment described above with reference to FIG. 1 to FIG. 8, and further includes a lower bumper reinforcement 45, a second member 75, and a lower crash box 70.

The radiator support 35 being a first member is a plate-shaped member bent into a crank shape. The radiator support 35 is held between the front end 14 of the front side member 10 and the rear end plate 56 of the crash box 50, and is fixed by being fastened to the flange 15 along with the rear end plate 56 of the crash box 50 so as to extend downward from a fixed portion.

The lower bumper reinforcement 45 is a rigid member that is disposed below the bumper reinforcement 40 and extends in the vehicle width direction.

The second member 75 is a rigid member that is disposed below the front side member 10, connected at a leading end to a lower end of the radiator support 35 with a bolt 79, and extends from the radiator support 35 toward the rear side of the vehicle. The second member 75 is connected at a rear end to a suspension member 76 with a bolt 78. The suspension member 76 is a plate-shaped member that is connected at a rear end to the under reinforcement 109 disposed on the lower surface of the cabin frame 102 and that covers a lower front side of the vehicle. The suspension member 76 is connected at a front end to the front side member 10 by a vertical member 77.

The lower crash box 70 is disposed between the second member 75 and the lower bumper reinforcement 45, and assembled to the second member 75 via the radiator support 35. The lower crash box 70 absorbs collision energy by undergoing compressive plastic deformation in the vehicle front-rear direction between the lower bumper reinforcement 45 and the second member 75 in a frontal collision. The lower crash box 70 is a columnar member provided with a plurality of circular holes 71, and is mounted on the radiator support 35 through a square base plate 72. The rear end plate 56 of the crash box 50 is also fixed to the radiator support 35, and therefore the crash box 50 and the lower crash box 70 are connected to each other through the radiator support 35.

Since the crash box 50 and the lower crash box 70 are thus connected to each other through the radiator support 35, in the event of a small-overlap frontal collision, the lower bumper reinforcement 45 moves backward substantially parallel to the vehicle front-rear direction along with the bumper reinforcement 40. Thus, the lower crash box 70 as well as the upper crash box 50 does not tilt inward in the vehicle width direction, and the lower crash box 70 can also effectively absorb the collision energy. Therefore, the vehicle front structure 85 can effectively absorb a larger amount of collision energy than the vehicle front structure 80 of the above-described embodiment.

What is claimed is:

1. A vehicle front structure, comprising:
   a front side member disposed outward of a center of a vehicle in a vehicle width direction and extending in a vehicle front-rear direction;
   a bumper reinforcement disposed at a front end of the vehicle and extending in the vehicle width direction; and
   a crash box having a shape of a rectangular tube extending in the vehicle front-rear direction, the crash box extending farther outward in the vehicle width direction than the front side member, being provided between an end of the front side member on a front side in the vehicle front-rear direction and the bumper reinforcement and being configured to undergo compressive plastic deformation in the vehicle front-rear direction in a frontal collision of the vehicle,
      the crash box having an upper plate and a lower plate, the upper plate being arranged upper side of the lower plate in a vehicle height direction, each of the upper plate and the lower plate having bead rows disposed in the vehicle width direction, each of the bead rows being formed by beads extending in the vehicle width direction and arranged at predetermined intervals in the vehicle front-rear direction,
      the bead rows including a first bead row composed of first beads, and a second bead row composed of second beads longer than the first beads and disposed inward of the first bead row in the vehicle width direction.

2. The vehicle front structure according to claim 1, wherein
   the first bead row and the second bead row are disposed such that the first beads and the second beads are staggered in the vehicle front-rear direction.

3. The vehicle front structure according to claim 1, wherein
   the second beads composing the second bead row are equal in number to the first beads composing the first bead row, or larger in number than the first beads composing the first bead row.

4. The vehicle front structure according to claim 3, wherein
   the first bead row is disposed outward of the front side member in the vehicle width direction.

5. The vehicle front structure according to claim 3, wherein
   the second bead row is disposed such that a position of the second bead row in the vehicle width direction overlaps a position of the front side member in the vehicle width direction in a front view of the vehicle.

6. The vehicle front structure according to claim 1, wherein:
   the bead rows include a third bead row composed of third beads longer than the first beads, disposed farther on an inner side in the vehicle width direction than the second bead row, and disposed in a region where a position of the third bead row in the vehicle width direction overlaps a position of the front side member in the vehicle width direction in a front view of the vehicle; and
   the third beads are disposed such that the second beads and the third beads are staggered.

7. The vehicle front structure according to claim 1, wherein
   the crash box has an inner plate and an outer plate, the inner plate being inward of the outer plate in the vehicle width direction, the inner plate has a vertical bead row formed by vertical beads of a predetermined length extending in the vehicle height direction, the vertical beads being arranged at predetermined intervals in the vehicle front-rear direction, and the outer plate has no beads.

8. The vehicle front structure according to claim 1, further comprising:
- a gusset projecting outward in the vehicle width direction from a side surface of a front end portion of the front side member on an outer side of the front end portion of the front side member in the vehicle width direction; and
- a clearance filling member mounted on a portion of the crash box, the portion projecting farther outward in the vehicle width direction than the front side member, such that a leading end of the clearance filling member faces a front surface of the gusset across a clearance, wherein the clearance filling member is configured to transmit a collision load from the crash box to the gusset when the clearance is lost during the frontal collision.

9. The vehicle front structure according to claim 1, further comprising:
- a lower bumper reinforcement disposed below the bumper reinforcement in the vehicle height direction and extending in the vehicle width direction;
- a first member held and fixed at a fixed portion between a front end of the front side member and a rear end of the crash box and extending downward from the fixed portion;
- a second member disposed below the front side member in the vehicle height direction, the second member being connected at a front end of the second member to the first member, and extending from the first member toward a rear side of the vehicle; and
- a lower crash box disposed between the second member and the lower bumper reinforcement, the lower crash box being assembled to the second member via the first member, being connected to the first member, and being configured to undergo compressive plastic deformation in the vehicle front-rear direction in the frontal collision.

* * * * *